US012658514B2

(12) United States Patent
Yang et al.

(10) Patent No.: US 12,658,514 B2
(45) Date of Patent: *Jun. 16, 2026

(54) BOX OF BATTERY, BATTERY, POWER CONSUMPTION DEVICE, AND METHOD AND DEVICE FOR PRODUCING BATTERY

(71) Applicant: CONTEMPORARY AMPEREX TECHNOLOGY (HONG KONG) LIMITED, Hong Kong (CN)

(72) Inventors: Piaopiao Yang, Ningde City (CN); Xiaobo Chen, Ningde City (CN); Yao Li, Ningde City (CN); Xianda Li, Ningde City (CN); Jinru Yue, Ningde City (CN); Mingguang Gu, Ningde City (CN); Lu Hu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 180 days.

This patent is subject to a terminal disclaimer.

(21) Appl. No.: 18/462,008

(22) Filed: Sep. 6, 2023

(65) Prior Publication Data

US 2023/0420774 A1 Dec. 28, 2023

Related U.S. Application Data

(63) Continuation of application No. 17/551,775, filed on Dec. 15, 2021, now Pat. No. 11,784,371, which is a continuation of application No. PCT/CN2021/084416, filed on Mar. 31, 2021.

(51) Int. Cl.
| | |
|---|---|
| *H01M 50/204* | (2021.01) |
| *H01M 10/613* | (2014.01) |
| *H01M 10/625* | (2014.01) |
| *H01M 10/6554* | (2014.01) |
| *H01M 10/6556* | (2014.01) |
| *H01M 50/249* | (2021.01) |
| *H01M 50/317* | (2021.01) |

(52) U.S. Cl.
CPC ....... *H01M 50/204* (2021.01); *H01M 10/613* (2015.04); *H01M 10/625* (2015.04); *H01M 10/6554* (2015.04); *H01M 10/6556* (2015.04); *H01M 50/249* (2021.01); *H01M 50/317* (2021.01); *H01M 2200/10* (2013.01); *H01M 2200/20* (2013.01); *H01M 2220/20* (2013.01)

(58) Field of Classification Search
CPC ............. H01M 50/204; H01M 10/613; H01M 10/625; H01M 10/6554; H01M 10/6556; H01M 50/249; H01M 50/317; H01M 2200/10; H01M 2200/20; H01M 2220/20; H01M 10/0413; H01M 10/647; H01M 50/209; H01M 50/3425; H01M 50/367; H01M 50/375; H01M 50/383; H01M 10/0404; H01M 50/30; H01M 10/052;

H01M 10/0525; H01M 10/054; H01M 10/058; H01M 10/615; H01M 10/659; H01M 50/244; H01M 50/289; Y02E 60/10

See application file for complete search history.

(56) References Cited

U.S. PATENT DOCUMENTS

| | | | |
|---|---|---|---|
| 4,883,726 | A | 11/1989 | Peled et al. |
| 9,912,021 | B2 | 3/2018 | Andres |
| 11,024,901 | B2 | 6/2021 | Tasiopoulos et al. |
| 2009/0075158 | A1* | 3/2009 | Rudorff ............. H01M 10/6556 429/53 |
| 2009/0274952 | A1* | 11/2009 | Wood ................ H01M 10/6566 429/185 |
| 2013/0192807 | A1 | 8/2013 | DeKeuster |
| 2014/0342201 | A1 | 11/2014 | Andres |
| 2016/0351980 | A1* | 12/2016 | Herntier ............ H01M 10/6568 |
| 2018/0261814 | A1* | 9/2018 | Zacher ................. B01D 53/268 |
| 2018/0351219 | A1* | 12/2018 | Smith ................... H01M 50/30 |
| 2019/0157636 | A1 | 5/2019 | Miler et al. |

(Continued)

FOREIGN PATENT DOCUMENTS

| | | |
|---|---|---|
| CN | 110061329 A | 7/2019 |
| CN | 209401662 U | 9/2019 |

(Continued)

OTHER PUBLICATIONS

First Office Action dated Apr. 12, 2024 received in Chinese Patent Application No. CN 202180001151.7.

(Continued)

*Primary Examiner* — Muhammad S Siddiquee

(74) *Attorney, Agent, or Firm* — Scully, Scott, Murphy & Presser, P.C.

(57) ABSTRACT

Embodiments of the present application are provided with a box of a battery, a battery, a power consumption device, and a method and device for producing a battery. The box of the battery includes: an electrical chamber; a thermal management component; and a collection chamber, configured to collect emissions from the battery cell provided with the pressure relief mechanism when the pressure relief mechanism is actuated; wherein the thermal management component is configured to isolate the electrical chamber from the collection chamber, a pressure relief region is disposed on the thermal management component, and the emissions collected by the collection chamber is discharged through the pressure relief region. According to the technical solutions of the embodiments of the present application, the safety of the battery can be enhanced.

18 Claims, 14 Drawing Sheets

(56) References Cited

U.S. PATENT DOCUMENTS

| | | | |
|---|---|---|---|
| 2019/0229384 A1 | 7/2019 | Tasiopoulos et al. | |
| 2019/0312320 A1* | 10/2019 | Uchiyama | H01M 10/625 |
| 2021/0013886 A1 | 1/2021 | Vrudhula et al. | |
| 2021/0074960 A1* | 3/2021 | Stude | F16L 59/08 |
| 2021/0104801 A1* | 4/2021 | Chu | H01M 50/291 |
| 2022/0013853 A1 | 1/2022 | Zeng et al. | |

FOREIGN PATENT DOCUMENTS

| | | | |
|---|---|---|---|
| CN | 210040354 U | 2/2020 | |
| CN | 111106277 A | 5/2020 | |
| CN | 210723281 U | 6/2020 | |
| CN | 111668408 A | 9/2020 | |
| CN | 111668409 A | 9/2020 | |
| CN | 111952515 A | 11/2020 | |
| CN | 112018302 A | 12/2020 | |
| CN | 112018303 A | 12/2020 | |
| CN | 112072046 A | 12/2020 | |
| CN | 112086604 A | 12/2020 | |
| CN | 112086605 A | 12/2020 | |
| CN | 112103443 A | 12/2020 | |
| CN | 112151710 A | 12/2020 | |
| CN | 212085102 U | 12/2020 | |
| CN | 212323123 U | 1/2021 | |
| EP | 2804188 A1 | 11/2014 | |
| EP | 3958378 A1 | 2/2022 | |
| JP | 2019129149 A | 8/2019 | |
| KR | 20150061996 A | 6/2015 | |
| KR | 20160112435 A | 9/2016 | |
| KR | 20190089121 A | 7/2019 | |

OTHER PUBLICATIONS

Notice of Reasons for Refusal dated Aug. 5, 2024 received in Japanese Patent Application No. 2023-530039.

Notice of Preliminary Rejection dated Dec. 16, 2024 for Korean Patent Application No. 10-2023-7016346.

Non-Final Office Action dated Feb. 11, 2025 for U.S. Appl. No. 18/462,030.

International Search Report and Written Opinion dated Dec. 24, 2021 received in International Application No. PCT/CN2021/084416.

Office Action dated Apr. 11, 2022 received in U.S. Appl. No. 17/551,775.

Office Action dated Aug. 4, 2022 received in U.S. Appl. No. 17/551,775.

Extended European Search Report dated Aug. 18, 2022 received in European Patent Application No. EP 21770112.7.

Office Action dated Jan. 24, 2023 received in U.S. Appl. No. 17/551,775.

Notice of Allowance dated Jun. 7, 2023 received in U.S. Appl. No. 17/551,775.

Notice of Preliminary Rejection dated Aug. 28, 2025 received in Korean Patent Application No. 10-2023-7016346.

* cited by examiner

1

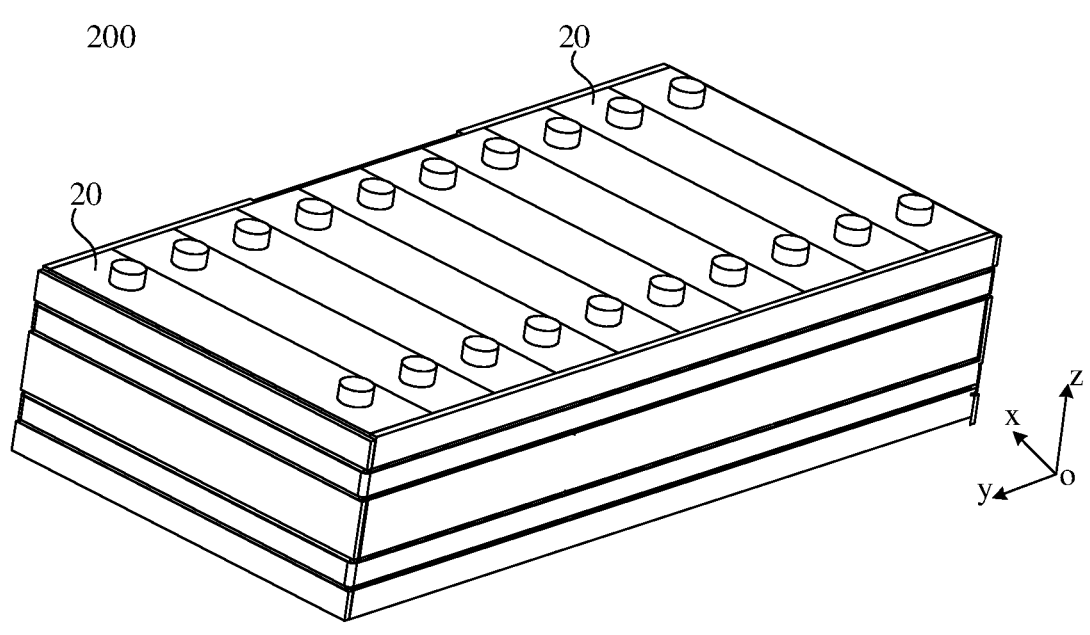
FIG. 3
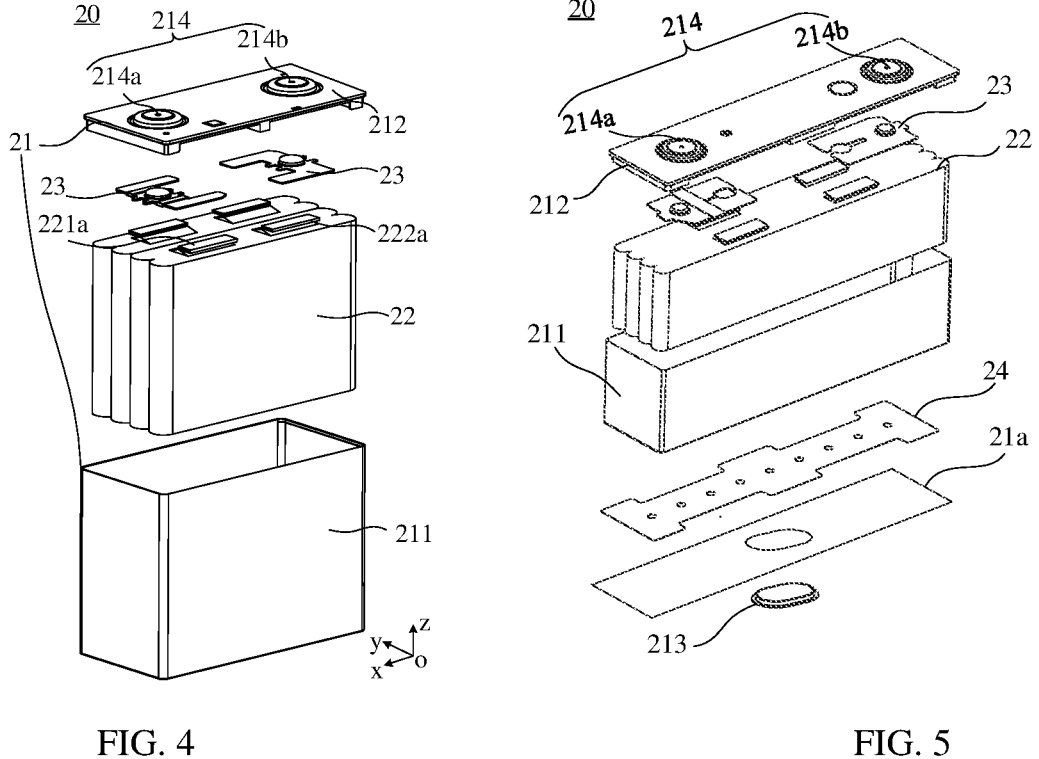
FIG. 4                                    FIG. 5

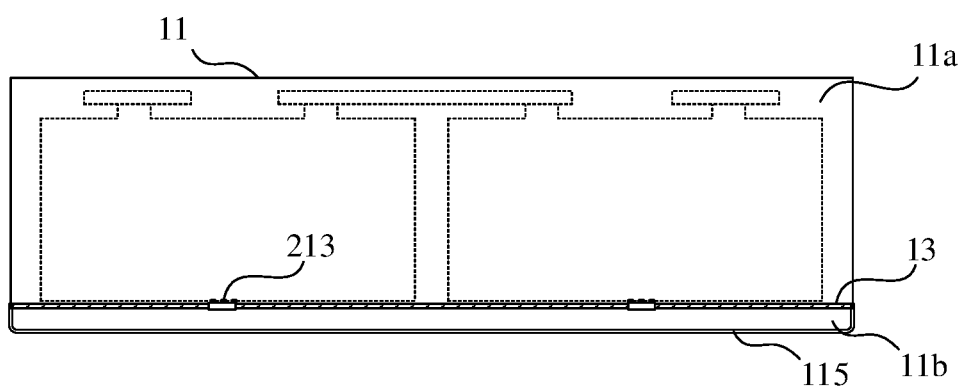
FIG. 13
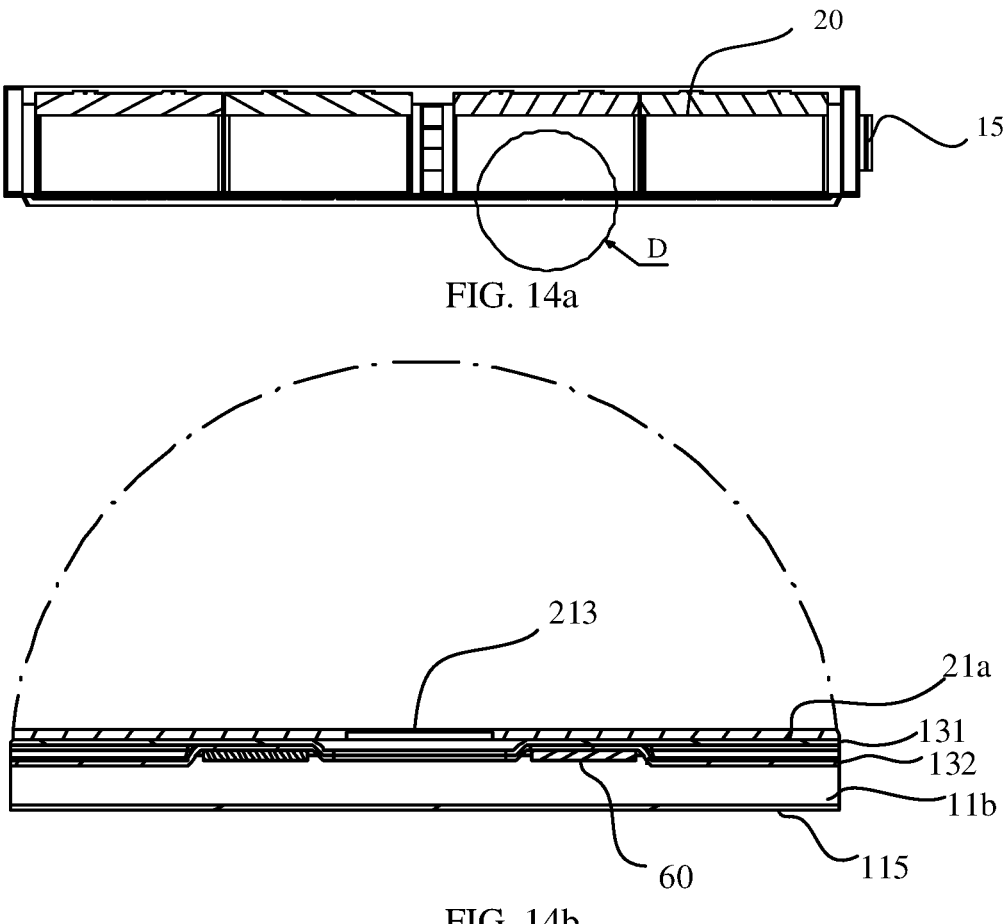
FIG. 14a
FIG. 14b

BOX OF BATTERY, BATTERY, POWER CONSUMPTION DEVICE, AND METHOD AND DEVICE FOR PRODUCING BATTERY

CROSS-REFERENCE TO RELATED APPLICATIONS

This application is a continuation of U.S. patent application Ser. No. 17/551,775 filed on Dec. 15, 2021, which is a continuation of International Application No. PCT/CN2021/084416, filed on Mar. 31, 2021, the disclosure of which is hereby incorporated by reference in its entirety.

TECHNICAL FIELD

The present application relates to the field of battery technologies, and in particular, to a box of battery, a battery, a power consumption device, a method for producing battery and a device for producing battery.

BACKGROUND

Energy saving and emission reduction are the key to the sustainable development of the automotive industry. In this case, electric vehicles have become an important part of the sustainable development of the automotive industry due to their advantages of energy conservation and environmental protection. For electric vehicles, the battery technology is also an important factor for their development.

During the development of the battery technology, in addition to improve the performance of a battery, safety is also an issue that cannot be ignored. If the safety of the battery cannot be ensured, then the battery cannot be used. Therefore, how to enhance the safety of the battery is an urgent technical problem to be solved in the battery technology.

SUMMARY

The present application is provided with a box of a battery, a battery, a power consumption device, and a method for producing a battery and A device for producing a battery, which can enhance the safety of the battery.

In a first aspect, a box of a battery is provided, including: an electrical chamber, configured to accommodate a plurality of battery cells, wherein at least one battery cell of the plurality of battery cells includes a pressure relief mechanism, and the pressure relief mechanism is configured to be actuated when an internal pressure or a temperature of the battery cell provided with the pressure relief mechanism reaches a threshold value, to relieve the internal pressure; a thermal management component, configured to accommodate a fluid to adjust the temperature of the plurality of battery cells; and a collection chamber, configured to collect emissions from the battery cell provided with the pressure relief mechanism when the pressure relief mechanism is actuated; wherein the thermal management component is configured to isolate the electrical chamber from the collection chamber, a pressure relief region is disposed on the thermal management component, and the emissions collected by the collection chamber is discharged through the pressure relief region.

In the battery box of the embodiment of the present application, the thermal management component is configured to isolate the electrical chamber for accommodating the battery cells from the collection chamber for collecting the emissions. When the pressure relief mechanism is actuated, the emissions of the battery cell enter the collection chamber instead of the electrical chamber, or a small amount of the emissions enter the electrical chamber, so that an electrical connection component in the electrical chamber is not conductive and short-circuited, and therefore the safety of the battery can be enhanced. At the same time, the emissions generated after the battery cell experiencing a runaway are discharged into the collection chamber, the emissions pass through the pressure relief region and then are discharged to the outside of the collection chamber, which can extend the discharging path of the emissions, effectively reduce the temperature of the emissions, and reduce the influence of the emissions on an external environment of the battery, thereby further enhancing the safety of the battery.

In some embodiments, the pressure relief region is staggered with the pressure relief mechanism.

The pressure relief region in the embodiment of the present application is a region disposed on the thermal management component that is not corresponding to the pressure relief mechanism, that is, the pressure relief region is staggered with the pressure relief mechanism. By staggering the positions of the two, the emissions in the collection chamber can be smoothly discharged to the outside of the collection chamber through the pressure relief region, which can achieve the effect of extending the exhaust path of the emissions, effectively reduce the temperature of the emissions, and reduce the influence of the emissions on the external environment of the battery, thereby further enhancing the safety of the battery.

In some embodiments, the pressure relief region is a pressure relief hole, and the emissions collected by the collection chamber are discharged through the pressure relief hole; or the pressure relief region is a weakened zone, and the emissions collected by the collection chamber are discharged after the weakened zone is damaged.

Optionally, the pressure relief region in the embodiment of the present application may be a pressure relief hole. At this time, the emissions in the collection chamber may be directly discharged through the pressure relief hole; alternatively, the pressure relief region in the embodiment of the present application may also be a weakened zone, and when the pressure or temperature in the collection chamber reaches a certain threshold, the emissions can be discharged after breaking through the weakened zone.

In some embodiments, the electrical chamber includes: a first pressure balance mechanism, where the first pressure balance mechanism is configured to balance a pressure inside and outside of the box, and the emissions are discharged to the outside of the box through the first pressure balance mechanism after passing through the pressure relief region.

After the emissions in the collection chamber in the embodiment of the present application pass through the pressure relief region, the emissions can be further discharged to the outside of the box through the first pressure balance mechanism. By providing the first pressure balance mechanism, the emissions can be discharged from the electrical chamber in time to reduce the influence of the emissions on other battery cells.

Optionally, there may be one or more first pressure balance mechanisms in the embodiment of the present application, and its number may be set according to actual conditions, which is not limited in the embodiment of the present application.

In some embodiments, the electrical chamber includes a first sub-chamber and a second sub-chamber, wherein the second sub-chamber is arranged adjacent to the first sub-chamber, the first sub-chamber is configured to accommodate the plurality of battery cells; an outer wall of the second sub-chamber is provided with the first pressure balance mechanism, and the emissions collected by the collection chamber enter the second sub-chamber through the pressure relief region and are discharged to the outside of the box through the first pressure balance mechanism.

After the emissions in the collection chamber pass through the pressure relief region, the emissions can enter the second sub-chamber that is isolated from the first sub-chamber for accommodating the battery cells. By providing the second sub-chamber as the discharging buffer zone for the emissions, the emissions can be isolated from the plurality of battery cells, which can reduce the influence of the emissions on the battery cells.

In some embodiments, the pressure relief region is disposed on a region of the thermal management component corresponding to the second sub-chamber.

By providing the pressure relief region corresponding to the second sub-chamber, the emissions in the collection chamber can enter the second sub-chamber after passing through the pressure relief region, so that the emissions can be further buffered to achieve the effect of extending the exhaust path, then reduce the temperature of the emissions, and reduce the influence of the emissions on the external environment of the battery, thereby further enhancing the safety of the battery.

In some embodiments, a second pressure balance mechanism is provided on a wall shared by the first sub-chamber and the second sub-chamber, and the second pressure balance mechanism is configured to balance a pressure between the first sub-chamber and the second sub-chamber.

In the embodiment of the present application, when an internal pressure of the first sub-chamber is greater than the pressure of the external environment, and if the internal pressure cannot be discharged to the outside of the box in time, it may cause damage to mechanical parts of the battery. In the embodiment of the present application, by providing the second pressure balance mechanism, the pressure in the first sub-chamber may be allowed to be discharged to the second sub-chamber through the second pressure relief mechanism, and discharged through the first pressure balance mechanism disposed on the outer wall of the second sub-chamber, such that the internal temperature or pressure in the first sub-chamber can be maintained in a normal state, and then the safety of the battery is ensured. At the same time, by releasing the internal temperature or pressure in the first sub-chamber to the second sub-chamber, the discharging of the emissions may be provided with a buffer zone, therefore the temperature of the emissions is further reduced, the influence of the emissions on the external environment is reduced, and the safety of the battery is further enhanced.

In some embodiments, the second pressure balance mechanism is opened in one way, and the second pressure balance mechanism is configured to release an inner pressure to the second sub-chamber when a pressure or a temperature in the first sub-chamber reaches a certain threshold.

The second pressure balance mechanism in the embodiment of the present application is opened in one way, which can release the pressure in the first sub-chamber into the second sub-chamber, thereby ensuring the balance of the pressure between the first sub-chamber and the second sub-chamber. At the same time, the emissions can only be released from the first sub-chamber to the second sub-chamber, and the emissions are prevented from entering the first sub-chamber from the second sub-chamber, which affects the safety of the battery cells.

In some embodiments, the first sub-chamber is communicated with the second sub-chamber only through the second pressure balance mechanism.

By providing the first sub-chamber to communicate with the second sub-chamber only through the second pressure balance mechanism, when the thermal runaway occurs, the gas in the second sub-chamber will not enter the first sub-chamber through other ways, which prevents the high-temperature emissions from affecting the battery cells in the first sub-chamber that are not experiencing a thermally runaway.

In some embodiments, a third pressure balance mechanism is provided on other walls of the first sub-chamber except a wall of the first sub-chamber shared by the first sub-chamber and the second sub-chamber, and the third pressure balance mechanism is configured to release the inner pressure to the outside of the box when the pressure or temperature in the first sub-chamber reaches a certain threshold.

The third pressure balance mechanism in the embodiment of the present application may allow the pressure in the first sub-chamber to be discharged in time, such that the pressures inside and outside of the first sub-chamber and the second sub-chamber are maintained in a normal state, thereby ensuring the safety of the battery.

In some embodiments, the electrical chamber is provided with a hollow beam, a first wall of the second sub-chamber is formed with at least a portion of the hollow beam, a fourth pressure balance mechanism is disposed on the first wall, the emissions collected by the collection chamber enter the hollow beam through the pressure relief region, and then enter the second sub-chamber through the fourth pressure balance mechanism, and is discharged to the outside of the box through the first pressure balance mechanism.

By providing the hollow beam and the fourth pressure balance mechanism on the second wall of the hollow beam, the emissions in the collection chamber can enter the hollow beam through the pressure relief region and then enter the second sub-chamber through the fourth pressure balance mechanism. After the pressure and temperature in the sub-chamber reach a certain threshold, the emissions are discharged to the outside of the box, thereby ensuring the balance of the pressure inside and outside of the battery and enhancing the safety of the battery.

In some embodiments, the electrical chamber is provided with a hollow beam, and the hollow beam is configured to be connected to an outer wall of the electrical chamber, a fifth pressure balance mechanism is disposed on the outer wall of the electrical chamber, the emissions collected by the collection chamber enter the hollow beam through the pressure relief region, and is discharged to the outside of the box through the fifth pressure balance mechanism.

In the embodiment of the present application, the emissions in the collection chamber can enter the hollow beam after passing through the pressure relief region, and be discharged through the fifth pressure balance mechanism on the outer wall of the electrical chamber that is connected to the hollow beam. By providing the hollow beam, the discharging path of the emissions in the collection chamber can be extended, which provide sufficient time for effectively reducing the temperature of the emissions, reduce the influence of the emissions on the external environment of the battery, thereby further enhancing the safety of the battery.

In some embodiments, the pressure relief region is disposed on a region of the thermal management component corresponding to the hollow beam.

By providing the pressure relief region corresponding to the second sub-chamber, the emissions in the collection chamber can enter the hollow beam after passing through the pressure relief region, so that the emissions can be further buffered to achieve the effect of extending the exhaust path, and then reduce the temperature of the emissions, and reduce the influence of the emissions on the external environment of the battery, thereby further enhancing the safety of the battery. Besides, a space inside the hollow beam can be used directly, and no additional gas buffer space is required, thereby increasing the energy density of the battery.

In some embodiments, a cooling material is provided in the hollow beam

By providing the cooling material in the hollow beam, on the one hand, the temperature of the emissions can be reduced, and on the other hand, the function of protecting the side wall of the hollow beam can also be achieved.

In some embodiments, a cooling material is provided on a surface of the thermal management component away from the battery cell.

By providing the cooling material on a wall of the thermal management component away from a surface of the battery cell (i.e., the bottom wall), the temperature of the emissions discharged through the pressure relief mechanism can be reduced, thereby reducing the influence of the emissions on the external environment and enhancing the safety performance of the battery.

Optionally, the cooling material provided on the bottom wall of the thermal management component in the embodiment of the present application may be arranged at a position that avoids the pressure relief mechanism and the above pressure relief region.

In some embodiments, the box further includes: a protective component, wherein the protective component is located on one side of the thermal management component away from the battery cell, the collection chamber is formed with the protective component and the thermal management component, and a cooling material is provided on the protective component.

The collection chamber formed with the protective component and the thermal management component can effectively collect and buffer the emissions and reduce the risk resulting therefrom. At the same time, the protective component can protect the thermal management component and prevent the thermal management component from being damaged by foreign objects. Further, by providing the cooling material on the protective component, on the one hand, the temperature of the emissions discharged from the pressure relief mechanism can be reduced, and on the other hand, the impact of the high-temperature emissions on the bottom of the protective component can be reduced, to protect the protective component.

In some embodiments, the protective component and the thermal management component are sealed and connected.

The protective component in the embodiment of the present application can be sealed with the thermal management component, such that the emissions in the collection chamber are discharged from the battery box after passing through the pressure relief region. Compared with the method that the emissions are discharged directly through the bottom wall of the protective component, the embodiment of the present application can extend the discharging path of the emissions, further reduce the temperature of the emissions, and reduce the influence of the emissions on the external environment of the battery, thereby further enhancing the safety of the battery.

In some embodiments, the cooling material provided on the protective component is disposed in a region of the protective component corresponding to the pressure relief mechanism.

By providing the cooling material on the protective component corresponding to the pressure relief mechanism, the effective degree of cooling the emissions can be improved, and a better protective effect can be achieved for the bottom of the protective component.

In some embodiments, the cooling material is a phase change material.

Optionally, the cooling material in the embodiment of the present application may be a phase change material, and the phase change material can melt and cool the emissions when it encounters high-temperature emissions. The cooling material in the embodiment of the present application may also be other materials, as long as the cooling effect can be achieved, which is not limited in the embodiment of the present application.

Optionally, the phase change material in the embodiment of the present application may be coated in a way that the surface of the exhaust path including the hollow beam, the thermal management component and the protective component is coated with the phase change material, wherein in the embodiment of the present application, a heat-resisting material, such as mica paper, may also be pasted on the surface including the above exhaust path, to protect the surface of the exhaust path.

In some embodiments, the thermal management component is configured to be capable of making the emissions enter the collection chamber through the thermal management component when the pressure relief mechanism is actuated.

Optionally, the thermal management component in the embodiment of the present application can be damaged, such that the emissions enter the collection chamber through the thermal management component, alternatively, the thermal management component can also directly communicate with the collection chamber, such that the emissions can enter the collection chamber with no requirement to damage the thermal management component.

In some embodiments, the thermal management component is provided with a wall shared by the electrical chamber and the collection chamber.

Since the thermal management component can isolate the emissions from the electrical chamber, as the wall shared by the electrical chamber and the collection chamber, therefore the hazard of the emissions is reduced and the safety of the battery is enhanced.

In some embodiments, the thermal management component is constructed to be damaged when the pressure relief mechanism is actuated to allow the fluid to flow.

By constructing the thermal management component to be damaged so that the fluid can flow out, the fluid can be used to cool the battery cells and the emissions, thereby further enhancing the safety of the battery.

In some embodiments, the thermal management component includes: a first thermally conductive plate, wherein the first thermally conductive plate is attached to the plurality of battery cells; a second thermally conductive plate, wherein the second thermally conductive plate is arranged on one side of the first thermally conductive plate away from the battery cell; and a flow channel, wherein the flow channel is formed between the first thermally conductive plate and the second thermally conductive plate to allow the fluid to flow therein.

The thermal management component in the embodiment of the present application includes a first thermally conductive plate and a second thermally conductive plate. A flow channel accommodating a fluid can be formed in the thermal management component with the first thermally conductive plate and the second thermally conductive plate, thereby cooling or heating the battery cell.

In some embodiments, the thermal management component in the pressure relief region is not provided with the flow channel.

No flow channel is provided where the pressure relief region is located, so that the emissions in the collection chamber can be more easily discharged through the pressure relief region.

In a second aspect, a battery is provided, including: a plurality of battery cells, wherein at least one battery cell of the plurality of battery cells includes a pressure relief mechanism, and the pressure relief mechanism is configured to be actuated when internal pressure or a temperature of the battery cell provided with the pressure relief mechanism reaches a threshold value, to relieve the internal pressure; and the box according to the first aspect.

In a third aspect, a power consumption device is provided, including the battery according to the second aspect.

In some embodiments, the power consumption device is a vehicle, a ship or a spacecraft.

In a fourth aspect, a method for producing a battery is provided, including: providing a plurality of battery cells, wherein at least one battery cell of the plurality of battery cells includes a pressure relief mechanism, and the pressure relief mechanism is configured to be actuated when internal pressure or a temperature of the battery cell provided with the pressure relief mechanism reaches a threshold value, to relieve the internal pressure; providing a box, wherein the box includes: an electrical chamber, configured to accommodate the plurality of battery cells; a thermal management component, configured to accommodate a fluid to adjust the temperature of the plurality of battery cells; and, a collection chamber, configured to collect emissions from the battery cell provided with the pressure relief mechanism when the pressure relief mechanism is actuated; wherein the thermal management component is configured to isolate the electrical chamber from the collection chamber, a pressure relief region is disposed on the thermal management component, and the emissions collected by the collection chamber is discharged through the pressure relief region; and accommodating the plurality of battery cells in the electrical chamber.

In a fifth aspect, A device for producing a battery is provided, including: a first provision module, configured to provide a plurality of battery cells, wherein at least one battery cell of the plurality of battery cells includes a pressure relief mechanism, and the pressure relief mechanism is configured to be actuated when internal pressure or a temperature of the battery cell provided with the pressure relief mechanism reaches a threshold value, to relieve the internal pressure; a second provision module, configured to provide a box, wherein the box includes: an electrical chamber, configured to accommodate the plurality of battery cells; a thermal management component, configured to accommodate a fluid to adjust the temperature of the plurality of battery cells; and, a collection chamber, configured to collect emissions from the battery cell provided with the pressure relief mechanism when the pressure relief mechanism is actuated; wherein the thermal management component is configured to isolate the electrical chamber from the collection chamber, a pressure relief region is disposed on the thermal management component, and the emissions collected by the collection chamber is discharged through the pressure relief region; and an installation module, configured to accommodate the plurality of battery cells in the electrical chamber.

BRIEF DESCRIPTION OF DRAWINGS

To describe the technical solutions in the embodiments of the present application more clearly, the following briefly describes the accompanying drawings required for the embodiments. Apparently, the accompanying drawings in the following description show merely some embodiments of the present application, and persons of ordinary skill in the art may still derive other drawings from these accompanying drawings without creative efforts.

FIG. 3 is a schematic structural diagram of a battery cell group disclosed in an embodiment of the present application;

FIG. 4 is an exploded view of a battery cell disclosed in an embodiment of the present application;

FIG. 5 is an exploded view of a battery cell disclosed in another embodiment of the present application;

FIG. 8b is a plan schematic diagram corresponding to the battery in FIG. 8a;

FIG. 11b is a plan schematic diagram corresponding to the battery in FIG. 11a;

FIG. 11c is an exploded view corresponding to a thermal management component and a hollow beam in FIG. 11a;

FIG. 12b is a partial detailed view corresponding to a position C in FIG. 12a;

FIG. 13 is a schematic structural diagram of another battery box disclosed in an embodiment of the present application;

FIG. 14a is a cross-sectional view corresponding to FIG. 8 along the direction of A-A';

FIG. 14b is a partial detailed view corresponding to a position D in FIG. 14a;

FIG. 15 is a partial detailed view of a layout of the cooling material corresponding to a position E in FIG. 11a;

FIG. 16 is a schematic diagram of an avoidance structure being an avoidance chamber disclosed in an embodiment of the present application;

Figure 1:
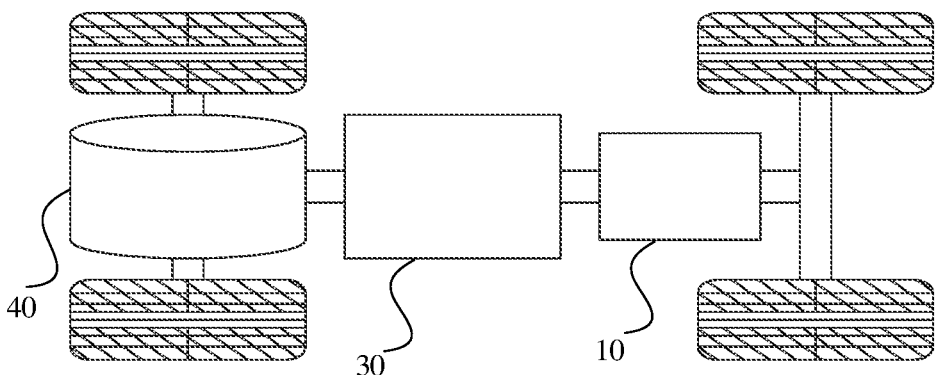
FIG. 1 is a schematic structural diagram of a vehicle disclosed in an embodiment of present application.

In the drawings, the drawings are not drawn to actual scale.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise provided, "a plurality of" means more than two (including two); and orientations or positional relationships indicated by terms such as "up", "down", "left", "right", "inside", and "outside" are merely for convenience of describing the present application and for simplifying the description, rather than for indicating or implying that an indicated apparatus or element must have a specific orientation, and must be constructed and operated in a specific orientation, which thus may not be understood as a limitation the present application. In addition, the terms "first", "second", and "third" are only intended for the purpose of description, and shall not be understood as an indication or implication of relative importance. "Vertical" is not strictly vertical, but within an allowable range of error. "Parallel" is not strictly parallel, but within an allowable range of error.

The orientation words appearing in the following description are all directions shown in the drawings, and do not limit the specific structure of the present application. In the description of the present application, it should be further noted that, unless explicitly specified and defined otherwise, terms "installation", "interconnection", and "connection" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

In the present application, a battery cell may include a primary battery, a secondary battery, such as a lithium-ion battery, a lithium-sulfur battery, a sodium/lithium-ion battery, a sodium-ion battery or a magnesium-ion battery, which is not limited in the embodiments of the present application. The battery cell may be cylindrical, flat, cuboid or in another shape, which is also not limited in the embodiments of the present application. The battery cells are generally divided into three types according to the way of packaging: cylindrical battery cells, prismatic battery cells and pouch battery cells, which are not limited by the embodiments of the present application.

The battery mentioned in the embodiment of the present application refers to a single physical module that includes one or more battery cells to provide a higher voltage and capacity. For example, the battery mentioned in the present application may be a battery pack and like. The battery pack generally includes a box for encapsulating one or more battery cells. The box can prevent liquid or other foreign objects from affecting the charging or discharging of the battery cells.

The battery cell includes an electrode assembly and an electrolyte, and the electrode assembly includes a positive electrode sheet, a negative electrode sheet and a separator. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. As an example, in a lithium-ion battery, the material of the positive electrode current collector may be aluminum, and the positive electrode active material may be lithium cobalt oxides, lithium iron phosphate, ternary lithium or lithium manganate, and like. The negative electrode sheet includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative electrode tab. The material of the negative electrode current collector may be copper, and the negative electrode active material may be carbon or silicon, and like. In order to ensure that no fusing occurs when a large current passes, there are a plurality of positive electrode tabs which are stacked together, and there are a plurality of negative electrode tabs which are stacked together. A material of the separator may be polypropylene (PP) or polyester resin (PET), and like. In addition, the electrode assembly may have a coiled structure or a laminated structure, and the embodiments of the present application are not limited thereto. With the development of the battery technology, it is necessary to consider many design factors, such as energy density, cycle life, discharge capacity, C-rate and other performance parameters. In addition, the safety of the battery should also be considered.

For a battery, a main safety hazard comes from the charging and discharging process, and in order to improve safety performance of the battery, a battery cell is generally provided with a pressure relief mechanism. The pressure relief mechanism refers to an element or component that is actuated when an internal pressure or temperature of the battery cell reaches a predetermined threshold, to relieve the internal pressure or temperature. The predetermined threshold may be adjusted according to different design requirements. The predetermined threshold may depend on the material of one or more of the positive electrode sheet, the negative electrode sheet, the electrolyte and the separator in the battery cell. The pressure relief mechanism may adopt, for example, a pressure-sensitive or temperature-sensitive element or component. That is, when the internal pressure or temperature of the battery cell reaches a predetermined threshold, the pressure relief mechanism is actuated, so as to form a channel for relieving the internal pressure or temperature.

The "actuation" mentioned in the present application means that the pressure relief mechanism acts, such that the internal pressure and heat of the battery cell can be relieved. The actions generated by the pressure relief mechanism may include but are not limited to: at least a part of the pressure relief mechanism being fractured, torn or melted, and so on. After the pressure relief mechanism is actuated, high-temperature and high-pressure substances inside the battery cell are discharged outwards from the pressure relief mechanism as emissions. In this way, the pressure in the battery cell can be relieved at a controllable pressure or temperature, thereby avoiding potentially more serious accidents.

The emissions from the battery cell mentioned in the present application include but are not limited to: an electrolyte, dissolved or split positive and negative electrode sheets, fragments of a separator, high-temperature and high-pressure gas generated by reaction, flame, or the like.

The pressure relief mechanism on the battery cell has an important influence on the safety of the battery. For example, when short circuit, overcharge and other phenomena occur in the battery cell, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. However, the flame, smoke and gas generated after the battery cell is experiencing a runaway, can instantly reach a temperature of more than 1000° C. If the current discharging method is adopted, the emission will directly influence the bottom of the battery box, which will easily ablate the corrosion-resistant coating on the bottom of the box, and at the same time, form a high-temperature hot spot, which will easily ignite the mixture of combustible gas and air and cause a fire event, and it is easy to accumulate high-temperature particles on the exhaust path, then the temperature of other battery cells will rise, which may further lead to thermal runaway events, thus posing a safety hazard.

In view of this, the embodiment of the present application is provided with a technical solution. The thermal management component is configured to isolate the electrical chamber for accommodating the battery cell from the collection chamber for collecting the emissions. When the pressure relief mechanism is actuated, the emissions of the battery cell enter the collection chamber instead of the electrical chamber, or a small amount of the emissions enter the electrical chamber, so that an electrical connection component in the electrical chamber is not conductive and short-circuited, and therefore the safety of the battery can be enhanced. At the same time, the emissions generated after the battery cell experiencing a runaway are discharged to the outside of the battery, the emissions pass through the pressure relief region and then are discharged to the outside of the collection chamber, which can extend the discharging path of the emissions, effectively reduce the temperature of the emissions, and reduce the influence of the emissions on an external environment of the battery, thereby further enhancing the safety of the battery.

The thermal management component is configured to isolate the electrical chamber from the collection chamber, such that the electrical chamber and the collection chamber are arranged on both sides of the thermal management component, and the thermal management component may be configured to accommodate a fluid to adjust the temperature of a plurality of battery cells. The fluid here may be liquid or gas, and temperature adjustment means heating or cooling the plurality of battery cells. In the box of cooling or lowering the temperature of the battery cells, the thermal management component is configured to contain a cooling fluid to lower the temperature of the plurality of battery cells. In addition, the thermal management component can also be configured to heat so as to raise the temperature of the plurality of battery cells, which is not limited in the embodiment of the present application. Optionally, the fluid can flow in a circulating manner to achieve better temperature adjustment effects. Optionally, the fluid may be water, a mixture of water and ethylene glycol, or air and like.

The electrical chamber mentioned in the present application may be configured to accommodate the plurality of battery cells and a bus component. The electrical chamber may be sealed or unsealed. The electrical chamber provides an installation space for the battery cells and the bus component. In some embodiments, a structure configured to fix the battery cells may also be provided in the electrical chamber. The shape of the electrical chamber may be determined according to the number and shape of the battery cells and the bus component which are accommodated therein. In some embodiments, the electrical chamber may be a cube with six walls. The bus component mentioned in the present application is configured to implement the electric connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding.

The collection chamber mentioned in the present application is configured to collect the emissions and may be sealed or unsealed. In some embodiments, the collection chamber may contain air or another gas. Optionally, the collection chamber may also contain a liquid, such as a cooling medium, or a component for accommodating the liquid is provided to further lower the temperature of the emissions entering the collection chamber. Further, optionally, the gas or the liquid in the collection chamber flows in a circulating manner.

The technical solutions described in the embodiments of the present application are all applicable to various apparatuses using batteries, such as mobile phones, portable apparatus, notebook computers, electromobiles, electronic toys, electric tools, electric vehicles, ships and spacecrafts. For example, the spacecrafts include airplanes, rockets, space shuttles and spaceships, and the like.

It should be understood that the technical solutions described in the embodiments of the present application are not only applicable to the foregoing devices, but also applicable to all devices using batteries. However, for the sake of brevity, the following embodiments take electric vehicles as an example for description.

For example, as shown in FIG. 1, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 may be used not only as an operating power source for the vehicle 1 but also as a driving power source for the vehicle 1, replacing or partially replacing fuel or natural gas to provide driving power for the vehicle 1.

In order to meet different power requirements, the battery in the present application may include a plurality of battery cells, where the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form battery modules, and then the multiple battery modules are connected in series, in parallel or in series and parallel to form a battery. That is, the plurality of battery cells may directly form a battery, or may first form battery modules, and then the battery modules form a battery.

Figure 2:
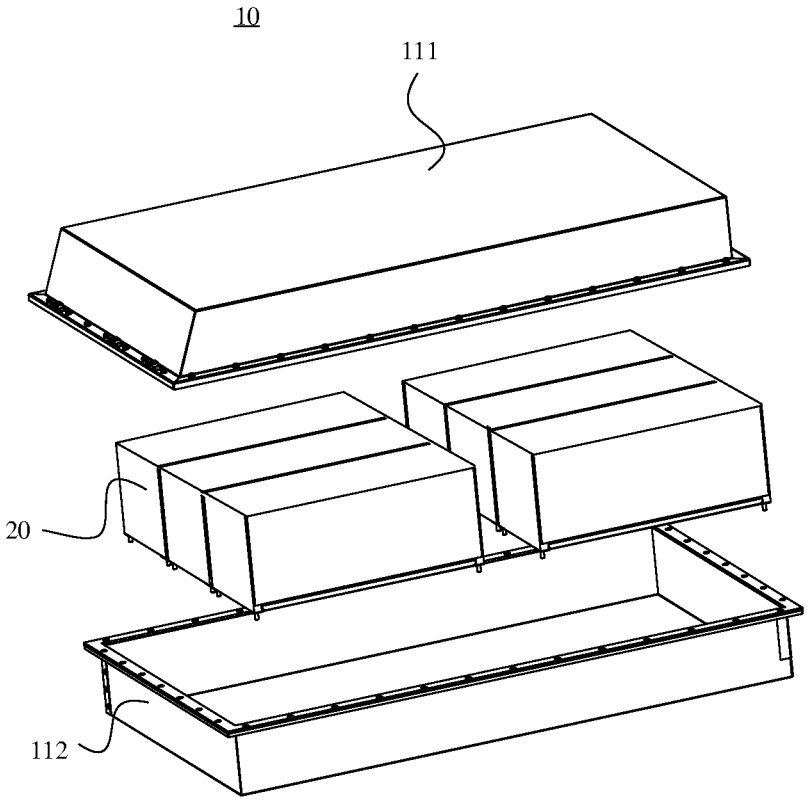
FIG. 2 is a schematic structural diagram of a battery disclosed in an embodiment of the present application.

For example, as shown in FIG. 2, FIG. 2 is a schematic structural diagram of a battery 10 according to an embodiment of the present application, the battery 10 may include a plurality of battery cells 20. The battery 10 may further include a box, inside of the box is a hollow structure, and the plurality of battery cells 20 are accommodated in the box. As shown in FIG. 2, the box may include two portions, which are referred to as a first portion 111 and a second portion 112, respectively, and the first portion 111 and the second portion 112 are fastened together. The shapes of the first portion 111 and the second portion 112 may be determined according to the shape of the combined battery cells 20, and the first portion 111 and the second portion 112 may each have an opening. For example, the first portion 111 and the second portion 112 each may be a hollow cuboid and each have only one surface with an opening, and the opening of the first portion 111 is arranged opposite to the opening of the second portion 112. The first portion 111 and the second portion 112 are fastened to each other to form a box with a closed chamber. The plurality of battery cells 20 are combined in parallel connection or series connection or series-parallel connection and are then placed in the box formed by fastening the first portion 111 to the second portion 112.

Optionally, the battery 10 may also include other structures, which will not be described in detail herein. For example, the battery 10 may also include a bus component. The bus component is configured to implement electric connection between the plurality of battery cells, such as parallel connection, series connection or series-parallel connection. Specifically, the bus component may implement the electrical connection between the battery cells by connecting electrode terminals of the battery cells. Further, the bus component may be fixed to the electrode terminals of the battery cells by means of welding. Electric energy of the plurality of battery cells can be further led out through an electrically conductive mechanism to pass through the box.

According to different power requirements, the number of the battery cells may be set to any value. The plurality of battery cells may be connected in series, in parallel or in series and parallel to achieve larger capacity or power. Since there may be many battery cells included in each battery 10, the battery cells may be arranged in groups for convenience of installation, and each group of battery constitutes a battery module 200. The number of battery cells included in the battery module 200 is not limited and may be set according to demands. For example, FIG. 3 is an example of a battery module. The battery may comprise a plurality of battery modules, and these battery modules may be connected in series, in parallel or in series and parallel.

As shown in FIG. 4, FIG. 4 is a schematic structural diagram of a battery cell 20 according to an embodiment of the present application. The battery cell 20 includes one or more electrode assemblies 22, a housing 211 and a cover plate 212. A shell 21 is formed with the housing 211 and the cover plate 212. A wall of the housing 211 and the cover plate 212 are each referred to as a wall of the battery cell 20. The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each of electrode terminals 214 is correspondingly provided with a connecting member 23, which is disposed between the cover plate 212 and the electrode assembly 22. The connecting member 23 is configured to achieve the electrical connection between the electrode assembly 22 and the electrode terminal 214.

As shown in FIG. 4, each electrode assembly 22 has a first electrode tab 221a and a second electrode tab 222a. The first electrode tab 221a and the second electrode tab 222a have opposite polarities. The first electrode tab 221a of the one or more electrode assemblies 22 is connected to an electrode terminal through a connecting member 23, and the second electrode tab 222a of the one or more electrode assemblies 22 is connected to the other electrode terminal through the other connecting member 23. In this battery cell 20, according to actual use requirements, there may be a single or a plurality of electrode assemblies 22. As shown in FIG. 4, there are four separate electrode assemblies 22 in the battery cell 20.

As shown in FIG. 5, FIG. 5 is a schematic structural diagram of a battery cell 20 provided with a pressure relief mechanism 213 according to another embodiment of the present application. The housing 211, the cover plate 212, the electrode assembly 22 and the connecting member 23 in FIG. 5 are consistent with the housing 211, the cover plate 212, the electrode assembly 22 and the connecting member 23 in FIG. 4, which will not be repeated here for brevity.

The battery cell shown in FIG. 5 may be provided with the pressure relief mechanism 213. In FIG. 5, the pressure relief mechanism 213 is disposed at the bottom wall of the battery cell 20, that is the wall 21a in FIG. 5, wherein the pressure relief mechanism 213 may be a part of the wall 21a, or may be an separate structure from the wall 21a, and is fixed to the wall 21a by means of welding, for example. When the pressure relief mechanism 213 is a part of the wall 21a, for example, the pressure relief mechanism 213 may be formed by providing an indentation on the wall 21a, and the thickness of the wall 21a corresponding to the indentation is less than the thicknesses of the regions of the pressure relief mechanism 213 other than the indentation. The indentation is the weakest position of the pressure relief mechanism 213. When excessive gas generated by the battery cell 20 causes the internal pressure of the housing 211 to rise and reach a threshold, or the internal temperature of the battery cell 20 rises and reaches a threshold due to the heat generated by the internal reaction of the battery cell 20, the pressure relief mechanism 213 can be fractured at the indentation, resulting in the communication between the inside and outside of the housing 211. The gas pressure and temperature are released outward through the cracking of the pressure relief mechanism 213, thereby preventing the battery cell 20 from exploding.

FIG. 5 is described taking the pressure relief mechanism 213 being located on the bottom wall of the battery cell 20, but it should be understood that the pressure relief mechanism 213 in the application embodiment may be located on the side wall of the housing 211, or may also be located on the cover plate 212, or, alternatively, may be located at a position where the two walls of the housing 211 intersect, which is not limited in the embodiment of the present application.

The pressure relief mechanism 213 may have various possible pressure relief structures, which is not limited by the embodiments of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

Figure 6:
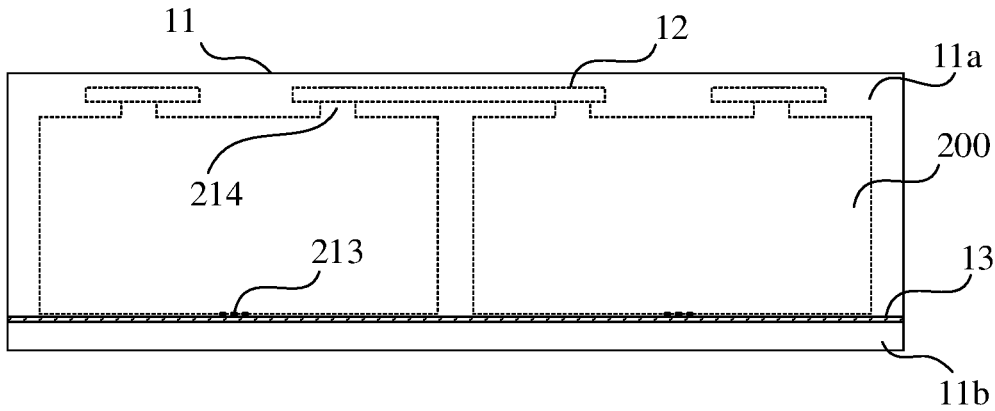
FIG. 6 is a schematic structural diagram of a battery disclosed in an embodiment of the present application.

FIG. 6 is a schematic diagram of a battery according to an embodiment of the present application. As shown in FIG. 6, the box 11 may include an electrical chamber 11a, a collection chamber 11b, and a thermal management component 13.

In the current design solution for the discharging of the battery cell after a runaway, the emissions are generally discharged to the outside of the battery after passing through the collection chamber, which may lead to greater damage to the collection chamber due to the high temperature of the emissions, and the accumulation of high temperature emissions may easily cause thermal runaway events, and the emissions discharged to the outside of the battery after passing through the collection chamber have a greater influence on the external environment. The embodiment of the present application proposes a box of a battery with respect to these problems, the thermal management component is configured to separate the electrical chamber for accommodating the battery cell from the collection chamber for collecting the emissions. When the pressure relief mechanism is actuated, the emissions of the battery cell enter the collection chamber instead of the electrical chamber, or a small amount of the emissions enter the electrical chamber, so that the electrical connection component in the electrical chamber is not conductive and short-circuited, and therefore the safety of the battery can be enhanced. At the same time, the emissions generated after the battery cell experiencing a runaway are discharged to the outside of the battery, the emissions pass through the pressure relief region and then are discharged to the outside of the collection chamber, which can extend the discharging path of the emissions, effectively reduce the temperature of the emissions, and reduce the influence of the emissions on the external environment of the battery, thereby further enhancing the safety of the battery.

The electrical chamber 11a is configured to accommodate a plurality of battery cells 20. At least one battery cell 20 of the plurality of battery cells 20 includes a pressure relief mechanism 213, and the pressure relief mechanism 213 is configured to be actuated when internal pressure or a temperature of the battery cell 20 provided with the pressure relief mechanism 213 reaches a threshold value, to relieve the internal pressure. The thermal management component 13 is configured to accommodate a fluid to adjust the temperature of the plurality of battery cells 20. And the collection chamber 11b is configured to collect emissions from the battery cell 20 provided with the pressure relief mechanism 213 when the pressure relief mechanism 213 is actuated. The thermal management component 13 is configured to isolate the electrical chamber 11a from the collection chamber 11b. A pressure relief region is disposed on the thermal management component 13, and the emissions collected by the collection chamber 11b are discharged through the pressure relief region.

Optionally, the electrical chamber 11a in the embodiment of the present application may also be configured to accommodate a bus component 12. The bus component 12 is configured to implement electrical connection between the plurality of battery cells 20. The bus component 12 may implement the electrical connection between the battery cells 20 by connecting electrode terminals 214 of the battery cells 20. The bus component 12 may implement the electrical connection between the battery cells 20 by connecting electrode terminals 214 of the battery cells 20.

For convenience of description, the battery cell 20 referred to in the following description of the pressure relief mechanism 213 refers to the battery cell 20 provided with the pressure relief mechanism 213. For example, the battery cell 20 may be the battery cell 20 in FIG. 5.

In a case of lowering the temperature of the battery cells 20, the thermal management component 13 in the embodiment of the present application may accommodate a cooling medium to adjust the temperature of the plurality of battery cells 20. In this case, the thermal management component 13 may also be referred as a cooling component, a cooling system, a cooling plate, or the like. In addition, the thermal management component 13 can also be used for heating, which is not limited by the embodiment of the present application. Optionally, the fluid can flow in a circulating manner to achieve better temperature adjustment effects.

As an implementation manner, the thermal management component 13 in the embodiment of the present application is not provided with a flow channel in the pressure relief region.

No flow channel is provided where the pressure relief region is located, so that the emissions in the collection chamber 11b can be more easily discharged through the pressure relief region 11b.

In the embodiment of the present application, the thermal management component 13 is configured to isolate the electrical chamber 11a from the collection chamber 11b. The so-called "isolation" here refers to separation, which may or may not be sealed. That is, the electrical chamber 11a for accommodating the plurality of battery cells 200 is separated from the collection chamber 11b for collecting the emissions. In this way, when the pressure relief mechanism 213 is actuated, the emissions from the battery cells 20 enter the collection chamber 11b instead of the electrical chamber, or a small amount of emissions enter the electrical chamber 11*a*, so that the electrical connection in the electrical chamber 11*a* is not affected, and therefore the safety of the battery can be enhanced.

Optionally, in an embodiment of the present application, the thermal management component 13 is provided with a wall shared by the electrical chamber 11*a* and the collection chamber 11*b*. As shown in FIG. 6, the thermal management component 13 may be both a wall of the electrical chamber 11*a* and a wall of the collection chamber 11*b*. That is, the thermal management component 13 (or a portion thereof) can be directly used as a wall shared the electrical chamber 11*a* and the collection chamber 11*b*. That is, the thermal management component 13 (or a part thereof) may directly serve as a wall shared by the electrical chamber 11*a* and the collection chamber 11*b*. In this way, the emissions from the battery cells 20 can enter the collection chamber 11*b* through the thermal management component 13. Meanwhile, due to the existence of the thermal management component 13, the emissions may be isolated from the electrical chamber 11*a* as far as possible, thus reducing the risk of the emissions and enhancing the safety of the battery.

Figure 7A:
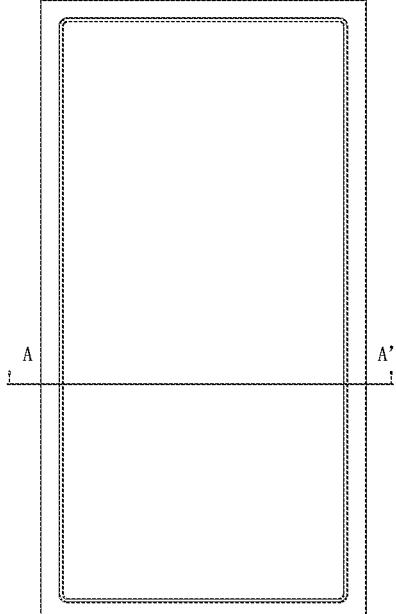
FIG. 7a is a plan schematic diagram of a battery disclosed in an embodiment of the present application.
Figure 7B:
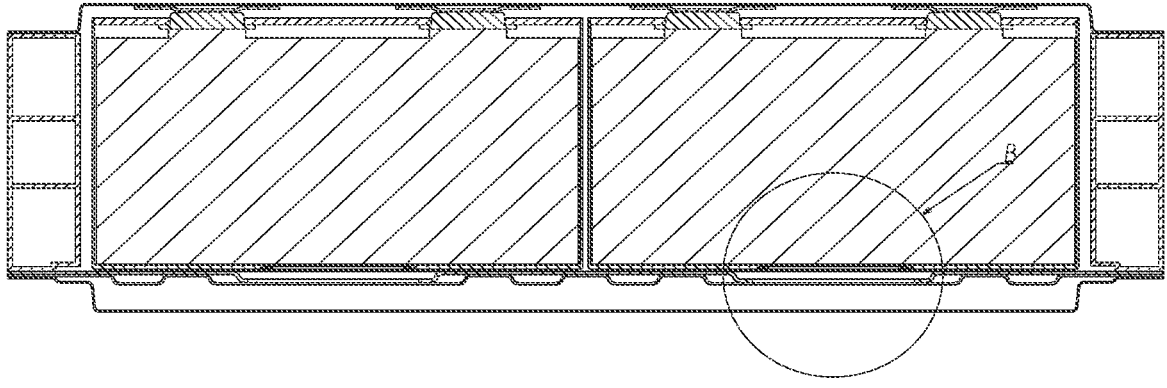
FIG. 7b is a cross-sectional view of a box disclosed in an embodiment of the present application along a direction of A-A'.
Figure 7C:
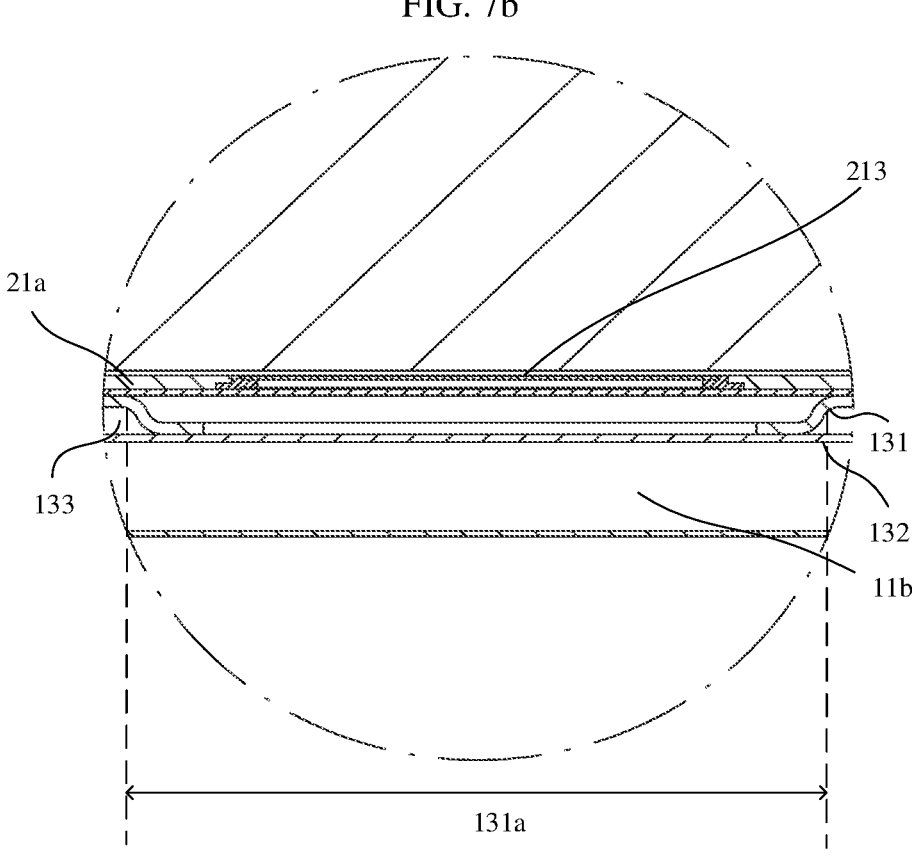
FIG. 7c is a partial detailed view corresponding to a position B in FIG. 7b.

As an embodiment, thermal management component 13 in the embodiment of the present application may include a first thermally conductive plate and a second thermally conductive plate, as shown in FIGS. 7*a* to 7*c*. FIG. 7*a* is a plan schematic diagram of a battery according to an embodiment of the present application, FIG. 7*b* is cross-sectional view of the box along a direction of A-A' according to an embodiment of the present application, and FIG. 7*c* is a partially detailed view corresponding to FIG. 7*b*.

As shown in FIGS. 7*a* to 7*c*, the thermal management component 13 may include: a first thermally conductive plate 131, wherein the first thermally conductive plate 131 is attached to the plurality of battery cells 20; a second thermally conductive plate 132, wherein the second thermally conductive plate 132 is arranged on one side of the first thermally conductive plate 131 away from the battery cell 20; and a flow channel 133, wherein the flow channel 133 is formed between the first thermally conductive plate 131 and the second thermally conductive plate 132 to allow the fluid to flow therein. Optionally, the first thermally conductive plate 131 in the embodiment of the present application may not be directly attached to the battery cell 20, rather, insulation pads and like may also be provided between the battery cells 20, which is not limited in the present application.

As shown in FIG. 7*c*, a flow channel 133, configured to contain the fluid, may formed with the first thermally conductive plate 131 and the second thermally conductive plate 132. The first thermally conductive plate 131 is located on one side of the second thermally conductive plate 132 that is close to the electrical chamber 11*b*, and attached to the first wall 21*a*.

Optionally, the materials of the first thermally conductive plate 131 and the second thermally conductive plate 132 may be metal. For example, aluminum or steel.

It should be understood that the above is only an exemplary description of an implementation manner of the thermal management component 13, and the embodiment of the present application is not limited thereto.

In the current discharging solution of the battery emissions, the emissions are directly discharged to the outside of the battery 10 after entering the collection chamber 11*b*. At this time, due to the high temperature of the emissions, it may cause damage to the bottom of the battery box 11, and the accumulation of the emissions is likely to cause the thermal runaway, and after the high-temperature emissions are discharged from the battery 10, there is a greater threat to the external environment of the battery 10.

On such basis, the pressure relief region provided on the thermal management component 13 in the embodiment of the present application may allow the emissions collected in the collection chamber 11*b* to be discharged to the outside of the collection chamber 11*b* after passing through the pressure relief region.

By the way of providing the pressure relief region on the thermal management component 13, the discharging path of the emissions collected in the collection chamber 11*b* is extended, the temperature of the emissions may be further reduced, so that the influence of the high-temperature emissions on the external environment can be further reduced, thus, the safety of the battery can be enhanced.

As an implementation manner, the pressure relief region in the embodiment of the present application may be staggered from the pressure relief mechanism 213.

By staggering the pressure relief region and the pressure relief mechanism 213, the exhaust path can be extended and the temperature of the emissions can be further reduced.

The staggered arrangement in the embodiment of the present application may refer to the arrangement that the two are not arranged in correspondence in position, but are set aside from each other.

Optionally, the above pressure relief region may be a pressure relief hole, and the emissions collected by the collection chamber 11*b* are discharged through the pressure relief hole; or the pressure relief region is a weakened zone, and the emissions collected by the collection chamber 11*b* are discharged after the weakened zone is damaged.

For example, when the pressure relief region is a pressure relief hole, the emissions in the collection chamber 11*b* may directly pass through the pressure relief hole, enter a specific exhaust path, and be discharged from the battery box 11. When the pressure relief region is a weakened zone, for example, the weakened zone may be thinned on the thermal management component 13, or a material different from other regions on the thermal management component 13 is used in the region where the weakened zone is located, such as a material with lower melting point, such that when the temperature or pressure of the emissions in the collection chamber 11*b* reach a certain threshold, the emissions can break through the weakened zone and enter a specific discharging path and be discharged to the battery box 11.

It should be understood that the pressure relief hole and weakened region in the embodiments of the present application are merely examples, and possible implementation manners of the pressure relief region are described, but the embodiments of the present application are not limited thereto.

As an implementation manner, the electrical chamber 11*a* in the embodiment of the present application may include: a first pressure balance mechanism, where the first pressure balance mechanism is configured to balance the pressure inside and outside of the box, and the emissions are discharged to outside of the box through the first pressure balance mechanism after passing through the pressure relief region. After the emissions in the collection chamber 11*b* pass through the pressure relief region, the emissions can enter a specific exhaust path and be discharged to the outside of the box 11 through the first pressure balance mechanism.

By providing the first pressure balance mechanism, the emissions can be discharged from the electrical chamber in time to reduce the influence of emissions on other battery cells.

It should be understood that the pressure balance mechanism in the embodiment of the present application indicates that the box 11 can be opened and closed by the pressure balance mechanism, such that the pressure on both sides of the pressure balance mechanism can be balanced. The first pressure balance mechanism can be opened and closed in one direction. At this time, the first pressure balance mechanism can release the pressure inside the battery box 11 to the outside of the battery box 11, or, the first pressure balance mechanism can also be opened and closed in bidirection, such that the pressure inside and outside the battery box 11 maintains a balance, which is not limited in the present application.

Optionally, there may be one or more first pressure balance mechanisms in the embodiment of the present application, and the number of the first balance mechanism may be set according to actual conditions, which is not limited in the embodiment of the present application.

Optionally, the first pressure balance mechanism in the embodiment of the present application may be a pressure relief valve, or other balance mechanism that can balance the pressure inside and outside the box 11, or the first pressure balance mechanism in the embodiment of the present application may also be a through hole.

The emissions in the collection chamber 11b are discharged to the outside of the box 11 through the pressure relief region and the first pressure balance mechanism, which can extend the exhaust path of the emissions, further reduce the temperature of the emissions, and reduce the influence of the high-temperature emissions on the battery box 11 and the external environment, thereby enhancing the safety of the battery.

Optionally, in the embodiment of the present application, the emissions in the collection chamber 11b can enter the specific exhaust path through the pressure relief region and then are discharged to the outside of the battery box 11 through the first balance pressure mechanism. The specific exhaust path may include: an independent chamber separated from the chamber for accommodating the battery cells, or the emissions may also enter the hollow beam after passing through the pressure relief region.

The following describes the two implementation manners.

As a first implementation manner, the electrical chamber 11b in the embodiment of the present application may include a first sub-chamber 111a and a second sub-chamber 112a, wherein the first sub-chamber 111a is configured to accommodate a plurality of battery cells 20, and the second sub-chamber 112a is arranged adjacent to the first sub-chamber 111a; the first pressure balance mechanism 15 is disposed on the outer wall of the second sub-chamber 112a, and the emission collected by the collection chamber 11b enter the second sub-chamber 112a through the pressure relief region and are discharged to the outside of the box 11 through the first pressure balance mechanism 15.

Figure 8A:
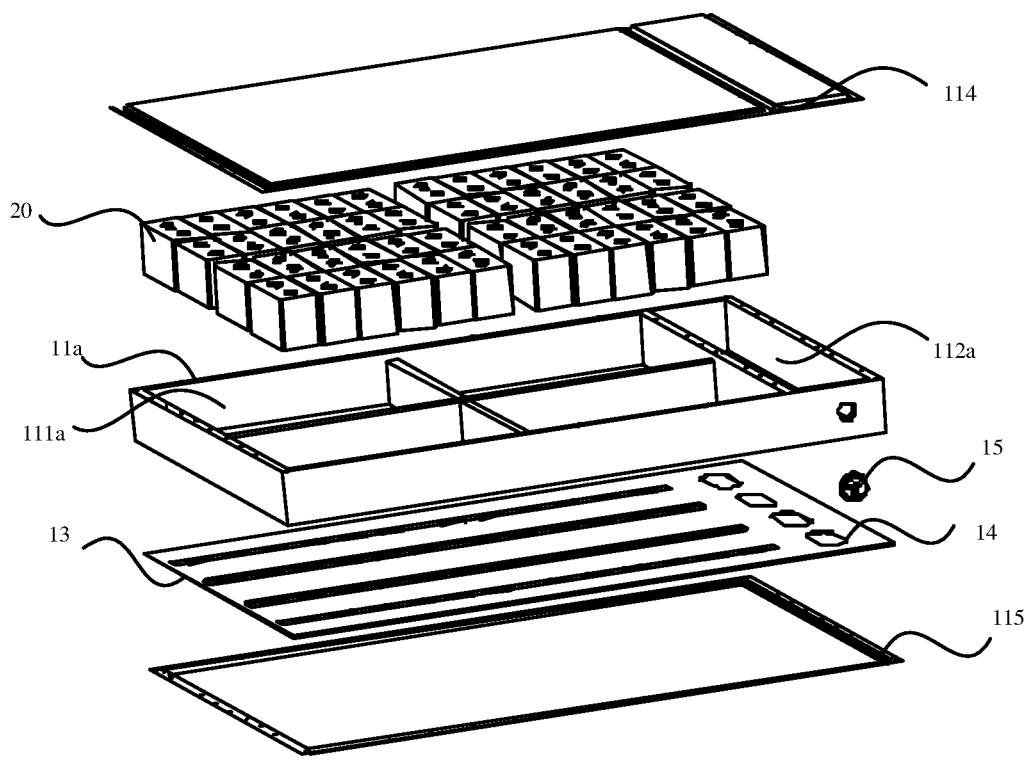
FIG. 8a is an exploded view of a battery disclosed in an embodiment of the present application.
Figure 8B:
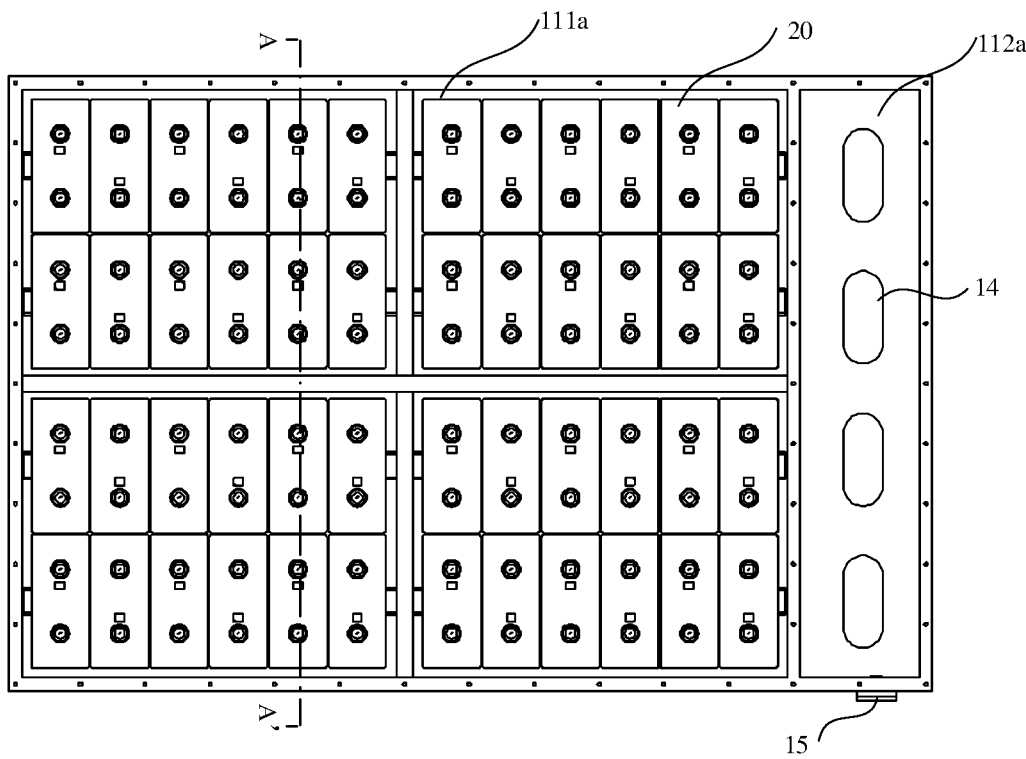

As shown in FIGS. 8a to 8b, FIG. 8a is an exploded view of a battery according to an embodiment of the present application, and FIG. 8b is a plan schematic diagram corresponding to the battery in FIG. 8a. As shown in FIG. 8a, the electrical chamber 11a may include the first sub-chamber 111a and the second sub-chamber 112a, the first sub-chamber 111a may be configured to accommodate the plurality of battery cells 20, wherein the first sub-chamber 111a and the second sub-chamber 112a are mutually isolated spaces, to prevent the emissions that enter the second sub-chamber 11b from entering the first sub-chamber accommodating the battery cell 20, thereby ensuring the safety performance of the battery.

It should be understood that, the second sub-chamber 112a is described as an example in the embodiment of the present application, and its specific number and position can be set according to actual conditions, which is not limited in the embodiment of the present application. In addition, the first sub-chamber 111a exemplarily illustrated in the embodiment of the present application may be divided into four parts by the beam 113a in the electrical chamber 11a, which is not limited in the embodiment of the present application.

In order to ensure that the emissions can enter the second sub-chamber 112a smoothly, the pressure relief hole 14 or the thinned weakened zone may be arranged on the thermal management component 13, which is not limited in the embodiment of the application.

Optionally, the pressure relief hole 14 is arranged in the region on the thermal management component 13 that is corresponding to the second sub-chamber 112a, in this way, the emissions in the collection chamber 11b can enter the second sub-chamber 112a through the pressure relief hole 14.

Further, in order to allow the emissions in the second sub-chamber 112a to be discharged to the outside of the box 11, a first pressure balance mechanism 15 may be arranged on the outer wall of the second sub-chamber 112a, and the emissions collected in the collection chamber 11b can enter the second sub-chamber 112a after passing through the pressure relief hole 14. When the pressure or temperature in the second sub-chamber 112a reaches a certain threshold, the emissions can be discharged from the first pressure balance mechanism 15 arranged on the outer wall of the second sub-chamber 112a to the outside of the battery box.

In the embodiment of the present application, by providing the second sub-chamber 112a for the electrical chamber 11a, a buffer zone may be provided to the emissions to isolate the emissions from the plurality of battery cells, which can lower the influence of the emissions on the first sub-chamber 111a of the battery cell.

The box 11 in the embodiment of the present application may also include a top cover, such as the top cover 114 shown in FIG. 8a, the top cover 114 may correspond to the first portion 111 in FIG. 2, the electrical chamber 11a and the collection chamber 11b as a whole may correspond to the second portion 112 in FIG. 2, or, alternatively, the top cover 114 may only correspond to the upper surface of the first portion 111 in FIG. 2, the part composed of the surrounding part of the first portion 111 and the second portion 112 can correspond to the whole composed of the electrical chamber 11a and the collection chamber 11b, which can be set according to the actual situation.

When the battery cell is experiencing a thermal runaway, the battery cell 20 can generally discharge the internal pressure and temperature through the corresponding pressure relief mechanism 213. However, in some specific scenarios, when the battery cell 20 experiencing a thermal runaway, the pressure of the battery cell 20 is not discharged from the pressure relief mechanism 213, but is released from other positions of the housing 211 and discharged into the electrical chamber 11a, such that the internal pressure and temperature in the electrical chamber 11a increase. If the gas cannot be discharged to the outside of the battery 10 in time, the internal pressure of the battery 10 increases, which may cause damage to the mechanical parts of the battery 10; or, when the altitude of the battery 10 changes and causes the pressure inside and outside of the battery 10 to change, the pressure inside and outside of the electrical chamber 11a may not be able to restore balance quickly.

With respect to the above problems, in the embodiment of the present application, the wall shared by the first sub-chamber 111a and the second sub-chamber 112a may be provided with the second pressure balance mechanism 16, and the second pressure balance mechanism 16 may be configured to balance the pressure between the first sub-chamber 111a and the second sub-chamber 112a.

Figure 9:
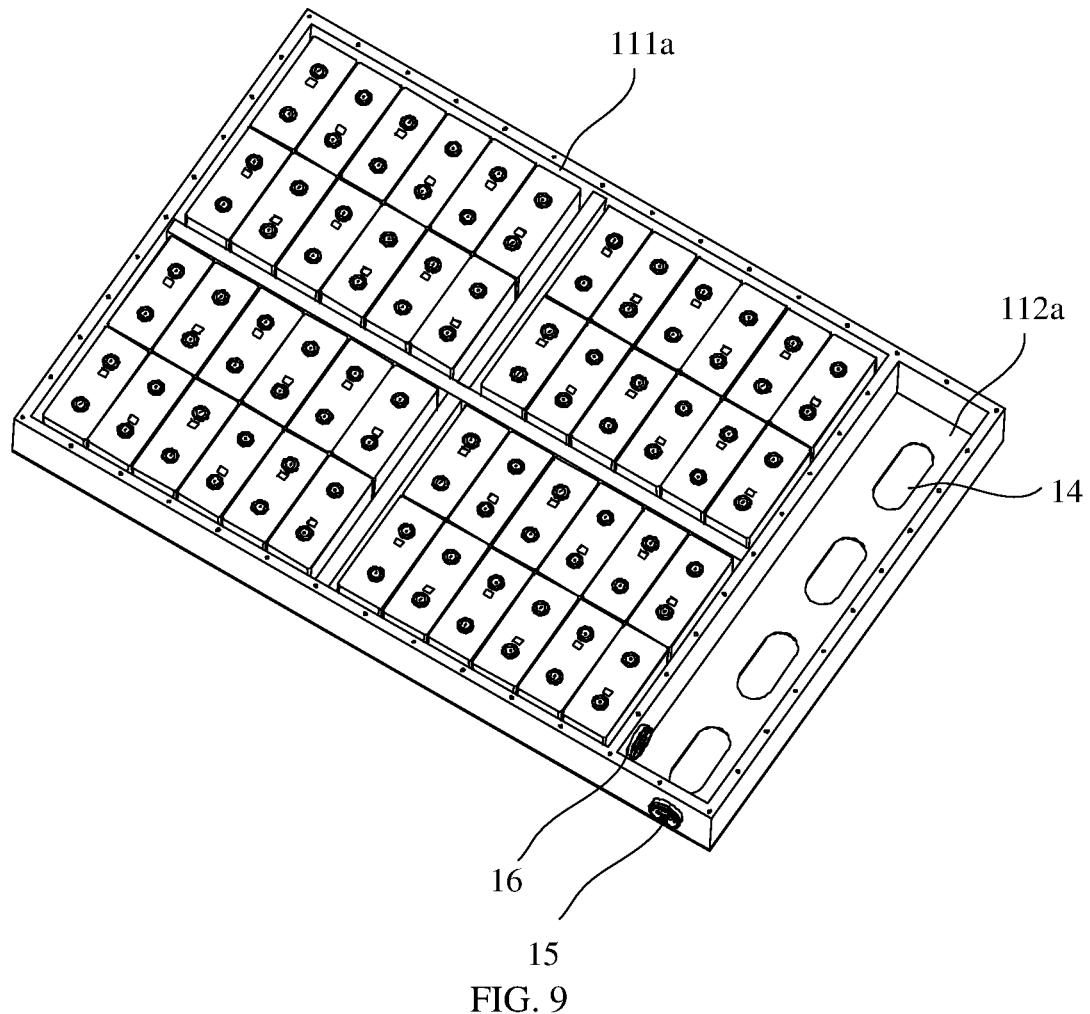
FIG. 9 is a plan schematic diagram of a battery disclosed in an embodiment of the present application.

FIG. 9 shows a plan schematic structural diagram of a battery provided with a second pressure balance mechanism in an embodiment of the present application. FIG. 9 may be a schematic diagram of a situation in which a second sub-chamber 112a is provided corresponding to the box 11.

It should be understood that the above is only an exemplary description of an arrangement method of the second pressure balance mechanism, and the embodiment of the present application is not limited thereto.

As shown in FIG. 9, the wall shared by the first sub-chamber 111a and the second sub-chamber 112a may be provided with a second pressure balance mechanism 16.

When the emissions generated by the battery cell 20 are not discharged through the pressure relief mechanism 213 and are discharged through other positions of the housing 211, the emissions in the first sub-chamber 111a may be discharged into the second sub-chamber 112a through the second pressure balance mechanism 16 when the pressure and temperature in the first sub-chamber 111a reach a certain threshold. Subsequently, when the pressure or temperature in the second sub-chamber 112a reaches a certain threshold, the emissions may be discharged through the first pressure balancing mechanism 15.

Optionally, the second pressure balance mechanism 16 in the embodiment of present application is opened in one way, and the second pressure balance mechanism 16 is configured to release the inner pressure to the second sub-chamber when the pressure or temperature in the first sub-chamber 111a reaches a certain threshold.

As an implementation manner, in the embodiment of the present application, the first sub-chamber 111a is communicated with the second sub-chamber 112b only through the second pressure balance mechanism 16.

By providing the first sub-chamber 111a to communicate with the second sub-chamber 112a only through the second pressure balance mechanism 16, when the battery cell 20 is experiencing the thermal runaway, the gas in the second sub-chamber 112a will not enter the first sub-chamber 111a in other ways, which prevents high-temperature emissions affect the battery cells 20 in the first sub-chamber 111a that are not experiencing a thermally runaway.

It should be understood that, taking the battery cell 20 experiencing a thermal runaway and releasing pressure as an example, the embodiments of the present application can also be applied to the situation where the internal and external pressures are unbalanced due to the changes in the external environment of the battery 10, which is not limited in the present application.

In the embodiment of the present application, the first sub-chamber 111a for accommodating the battery cell 20 is provided with the second pressure balance mechanism 16, such that when the battery cell 20 is experiencing the thermal runaway, the emissions that are not discharged through the pressure relief mechanism 213 may be discharged smoothly through the second pressure balance mechanism 213 to the second sub-chamber 112a and be discharged to the outside of the battery 10 through the first pressure balance mechanism 15. On the one hand, it can ensure that the internal pressure of the electrical chamber 11a is discharged in time, and avoid the internal temperature or pressure of the battery 10 from being too high to cause disasters, in addition, the discharging path of the emissions may also be extended, the temperature of the emission may be reduced, and the influence of the emissions on the external environment may be reduced, thereby further enhancing the safety of the battery.

As an implementation manner, in the embodiment of the present application, a third pressure balance mechanism is provided on other walls of the first sub-chamber 111a except a wall of the first sub-chamber 111a shared by the first sub-chamber 111a and the second sub-chamber 112a, and the third pressure balance mechanism is configured to relieve inner pressure to the outside of the box 11 when the pressure or temperature in the first sub-chamber 111a reaches a certain threshold.

By providing a third pressure balance mechanism on other walls except the wall shared by the first sub-chamber 111a and the second sub-chamber 112a, the internal pressure and temperature of the battery cells 20 in the first sub-chamber 111a, which is experiencing the thermally runaway, may be discharged through the third pressure balancing mechanism in time, so that the air pressure inside and outside the first sub-chamber 111a and the second sub-chamber 112a can be balanced.

Optionally, the electrical chamber 11a in the embodiment of the present application may be provided with a hollow beam 113a, a first wall of the second sub-chamber 112a is formed with at least a portion of the hollow beam, a fourth pressure balance mechanism is disposed on the first wall, the emissions collected by the collection chamber enter the hollow beam through the pressure relief region, and then enter the second sub-chamber through the fourth pressure balance mechanism, and are discharged to the outside of the box through the first pressure balance mechanism.

Figure 10:
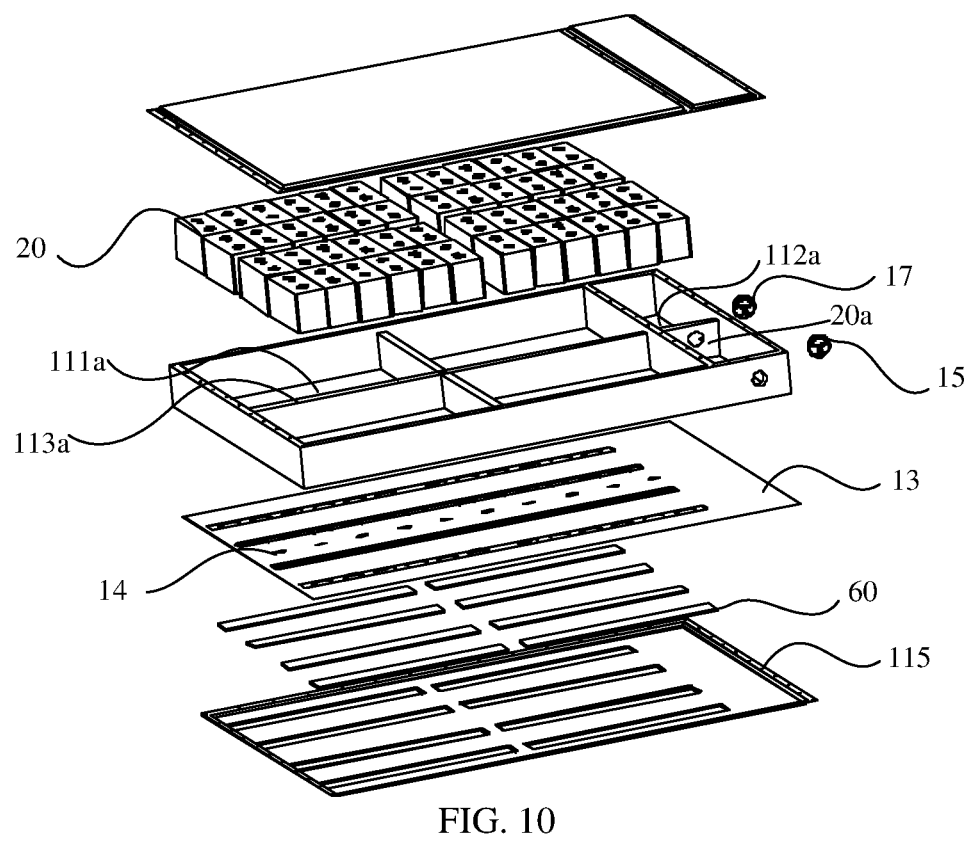
FIG. 10 is a schematic structural diagram of a battery box disclosed in an embodiment of the present application.

Specifically, as shown in FIG. 10, a fourth pressure balance mechanism 17 is provided on the first wall 20a common to the hollow beam 113a and the second sub-chamber 112a, and the emissions that enter the hollow beam 113a through the pressure relief hole 14 can pass through the fourth pressure balance mechanism 17 and enter the second sub-chamber 112a. When the internal pressure and temperature in the second sub-chamber 112a reach a certain threshold, the emissions may be discharged to the outside of the battery box 11 through the first pressure balance mechanism 15, such that the air pressure inside and outside of the battery may be balanced.

Optionally, the above hollow beam 113a and the following hollow beam 113a may refer to the same hollow beam, or the two may also be different hollow beams, which is not limited in the present application.

As a second implementation manner, the electrical chamber 11a of the embodiment of the present application may be provided with a hollow beam 113a, and the hollow beam 113a is configured to be connected to an outer wall of the electrical chamber 11a, a fifth pressure balance mechanism is disposed on the outer wall of the electrical chamber 11a, the emissions collected by the collection chamber 11a enter the hollow beam 113a through the pressure relief region, and are discharged to the outside of the box 11 through the fifth pressure balance mechanism 18.

It should be understood that the outer wall of the box 11 involved in the embodiment of the present application may be a wall that directly contacts the air outside the box 11.

Figure 11A:
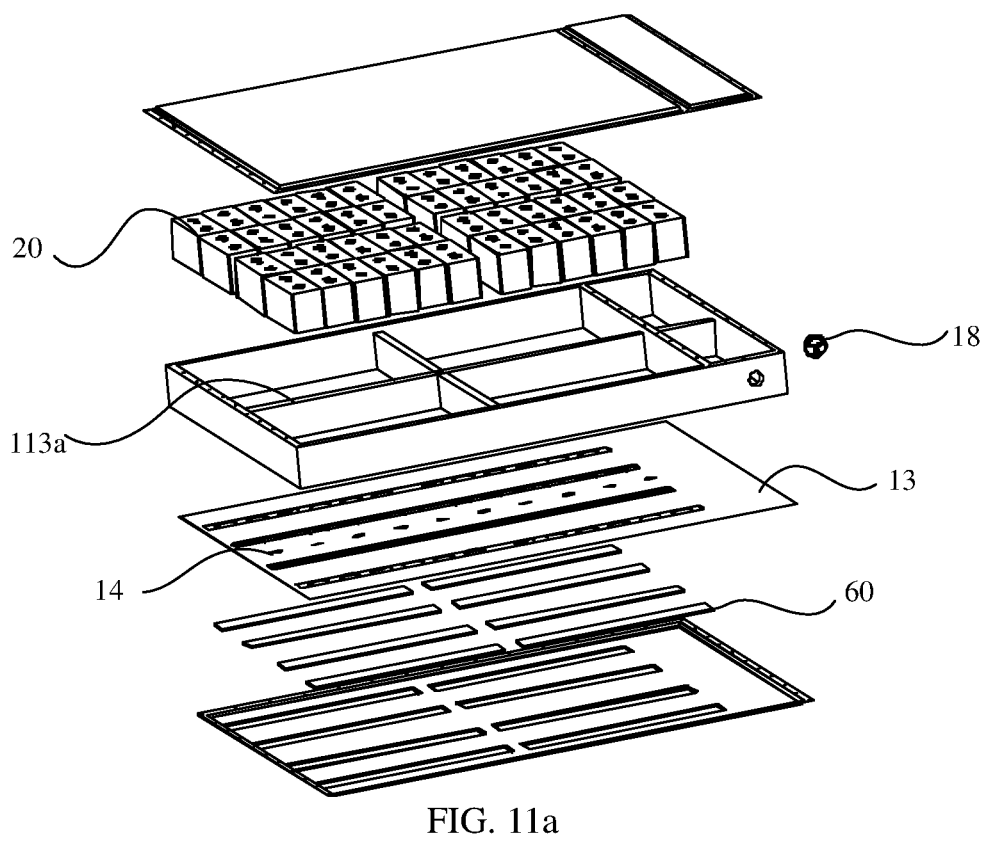
FIG. 11a is an exploded view of another battery disclosed in an embodiment of the present application.
Figure 11B:
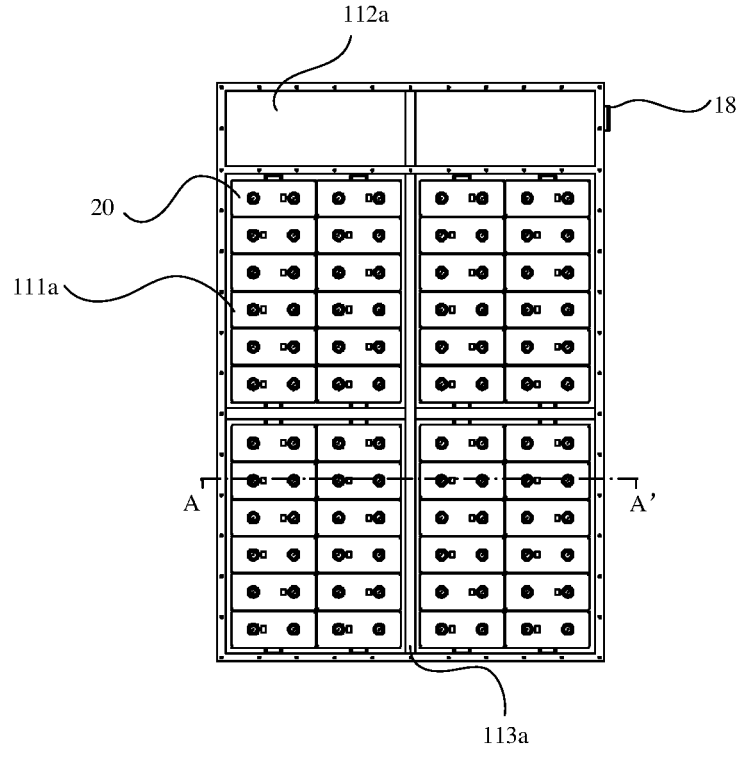
Figure 11C:
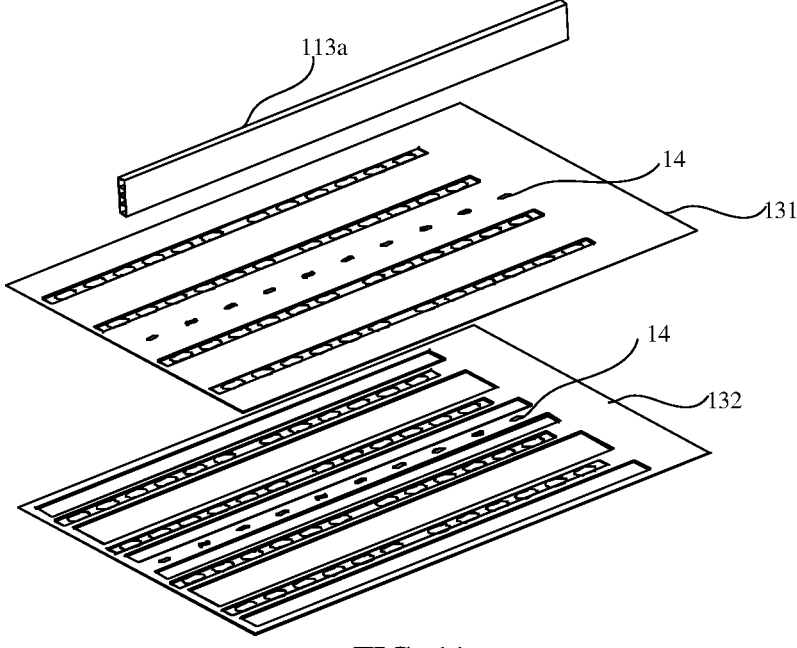

As shown in FIGS. 11a to 11c, wherein FIG. 11a is an exploded view of another battery in an embodiment of the present application, FIG. 11b is a plan schematic diagram corresponding to the battery in FIG. 11a, and FIG. 11c is an exploded diagram corresponding to the thermal management component and the hollow beam in FIG. 11a. As shown in FIG. 11a, the electrical chamber 11a may include one or more hollow beams 113a, and the one or more hollow beams 113a may isolate the plurality of battery cells 20, wherein the one or more hollow beams 113a may include hollow beams 113a arranged along the arrangement direction of the plurality of adjacent battery cells, or may include hollow beams 113a perpendicular to the arrangement direction of the battery cells.

Correspondingly, the position corresponding to the bottom of the hollow beam 113a on the thermal management component 13 may be provided with the above pressure relief region, such as the pressure relief hole 14 shown in FIG. 11c, or a weakened region, in this way, the emissions in the collection chamber 11b can enter the hollow beam 113a through the pressure relief hole 14. Optionally, when the thermal management component 13 in the embodiment of the present application includes the first thermally conductive plate 131 and the second thermally conductive plate 132, both the first thermally conductive plate 131 and the second thermally conductive plate 132 are provided with pressure relief holes 14 corresponding to the hollow beams 113a.

It should be understood that FIG. 11c only exemplarily describes a manner in which a hollow beam 113a in the box 11 corresponds to the pressure relief hole 14 on the thermal management component 13, and other hollow beams 113a in the embodiment of the present application may also correspond to the pressure relief holes 14 in other positions of the thermal management component 13, so that the emissions in the collection chamber 11b enter the hollow beam 113a through the pressure relief holes 14, which is not limited in the present application.

Optionally, the pressure relief hole 14 in the embodiment of the present application is provided corresponding to the hollow beam 113a. For example, the pressure relief hole 14 and the hollow beam 113a can be connected by drilling holes at the bottom of the hollow beam 113a, or, the hollow beams 113a may not be provided with a bottom wall but directly use the thermal management component 13 as its bottom wall, which is not limited in the embodiment of the present application.

Further, a fifth pressure balance mechanism 18 may be provided on the outer wall of the box 11. The emissions collected in the collection chamber 11b enter the hollow beam 113a after passing through the pressure relief hole 14. When the pressure or temperature inside the hollow beam 113a reaches a certain threshold, the emissions may be discharged to the outside of the battery box 11 through the fifth pressure balance mechanism 18 on the outer wall of the battery box 11.

It should be understood that the plurality of hollow beams 113a in the embodiment of the present application and the outer wall where the fifth pressure balance mechanism 18 are arranged to be in communication with each other.

Figure 12A:
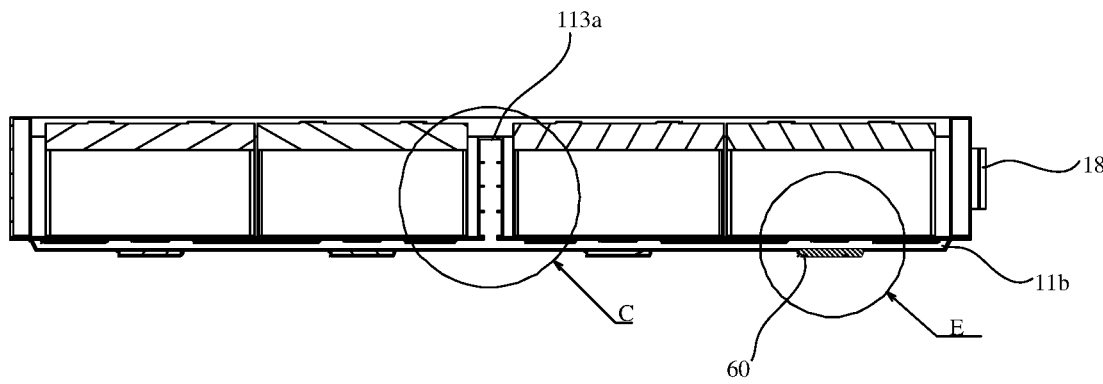
FIG. 12a is a cross-sectional view of a box disclosed in an embodiment of the present application along the direction of A-A' in FIG. 11b.
Figure 12B:
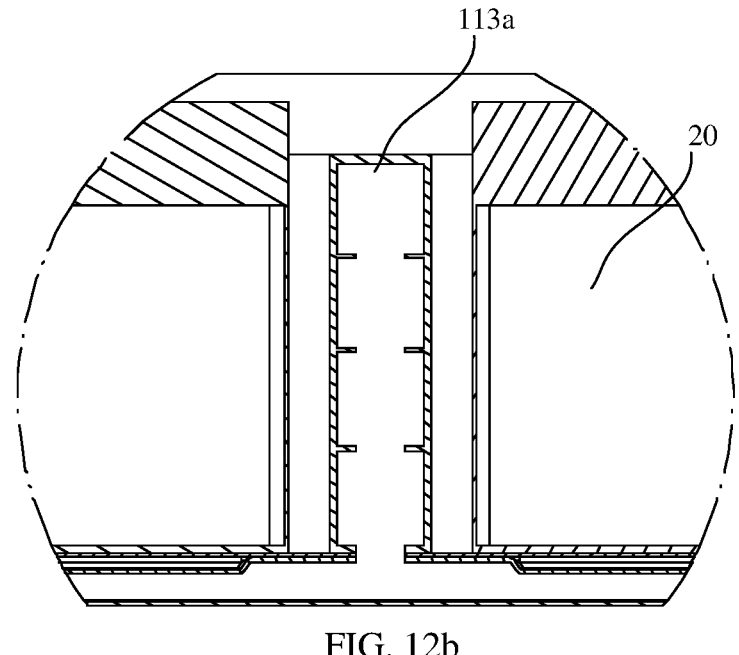

Here, FIG. 12a shows a cross-sectional view of a box in an embodiment of the present application along the direction of A-A' in FIG. 11b; and FIG. 12b is a partial detailed view corresponding to a position C in FIG. 12a.

In the embodiment of the present application, by the way of providing the mutual communicated hollow beams 113a and providing the fifth pressure balance mechanism 18 on the outer wall of the box 11, the exhaust path of the emissions collected by the collection chamber 11b is extended, the influence of the emissions on the collection chamber 11b is reduced, the temperature of the emissions is further reduced, and the influence of the high-temperature emissions on the external environment is reduced, and thus the safety performance of the battery is enhanced.

It should be understood that the above two ways of extending the exhaust path through the second sub-chamber 112a and the hollow beam 113a can be implemented respectively, or both can be implemented simultaneously, which is not limited in the embodiment of the present application.

As an implementation manner, in an embodiment of the present application, the collection chamber 11b may be formed with a thermal management component 13 and a protective component. For example, as shown in FIG. 13, the box 11 further includes a protective component 115. The protective component 115 is configured to protect the thermal management component 13, and the protective component 115 and the thermal management component 13 form the collection chamber 11b.

The collection chamber 11b formed by the protective component 115 and the thermal management component 13 does not occupy the space that may accommodate the battery cells. Therefore, the collection chamber 11b with a larger space therein can be provided, which may effectively collect and buffer the emissions and reduce the risk resulting therefrom.

Optionally, in an embodiment of the present application, a fluid, such as a cooling medium, may be further provided in the collection chamber 11b, or a component for accommodating the fluid may be provided to further cool the emissions entering the collection chamber 11b.

Optionally, in an embodiment of the present application, the collection chamber 11b may be a sealed chamber. For example, the connection between the protective component 115 and the thermal management component 13 may be sealed by a sealing member.

In order to further reduce the influence of high-temperature emissions on the exhaust path, the surface of the hollow beam 113a and/or the thermal management component 13 (for example, the surface of the thermal management component 13 away from the plurality of battery cells 20) and/or the protective component 115 in the embodiment of the present application may be provided with a cooling material.

The cooling material provided on the thermal management component 13 may be provided on its bottom wall, and avoid the position corresponding to the pressure relief mechanism 213 and the position corresponding to the pressure relief region. In this way, the cooling material provided on the bottom wall of the thermal management component 13 may cool the emissions of the collection chamber 11b passing through the thermal management component 13, thereby reducing the influence of the high-temperature of the emissions on the box 11 and further reducing the influence of high-temperature emissions on the external environment of the battery 10.

Figure 14C:
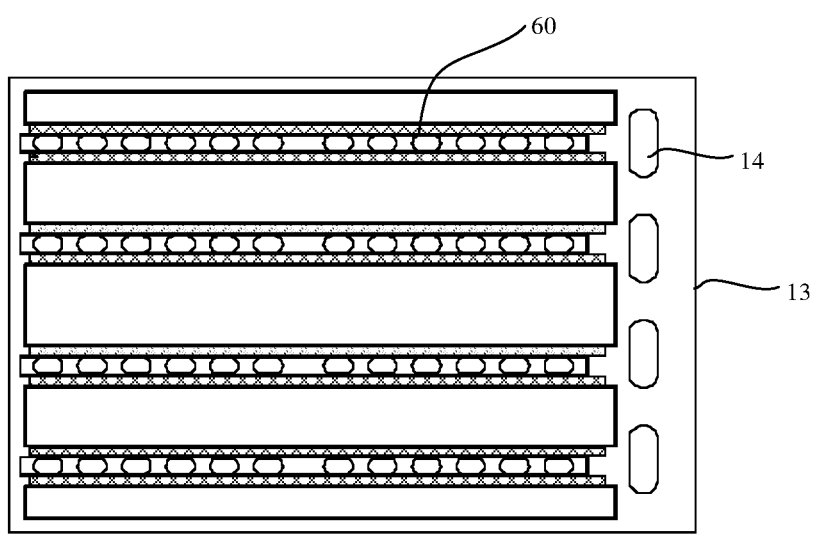
FIG. 14c is a schematic diagram of a layout of a cooling material on a thermal management component.
Figure 14D:
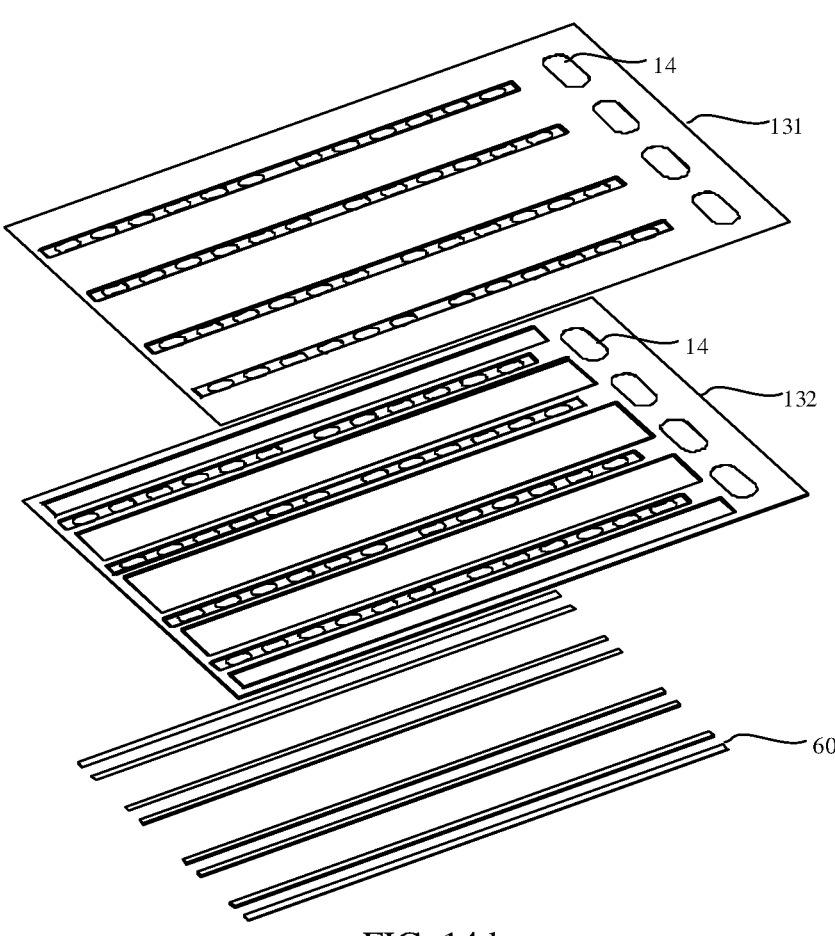
FIG. 14d is an exploded diagram of the cooling material and the thermal management component.

As shown in FIGS. 14a to 14d, FIG. 14a is a cross-sectional view corresponding to FIG. 8 along the A-A' direction; FIG. 14b is a partial detailed view corresponding to FIG. 14a; FIG. 14c a schematic diagram of a layout of the cooling material on the thermal management component; and FIG. 14d is an exploded diagram of a cooling material and a thermal management component. As shown in FIGS. 14b and 14c, the cooling material 60 can be arranged on the bottom wall of the thermal management component 13 and stagger the corresponding positions of the pressure relief mechanism 213 and the pressure relief hole 14, wherein, when the thermal management component 13 includes a first thermally conductive plate 131 and the second thermally conductive plate 132, the cooling material 60 is arranged at the bottom of the second thermally conductive plate 132.

As an implementation manner, the cooling material may be provided on the protective component 115 at a position corresponding to the pressure relief mechanism 213.

Figures 15, 16:
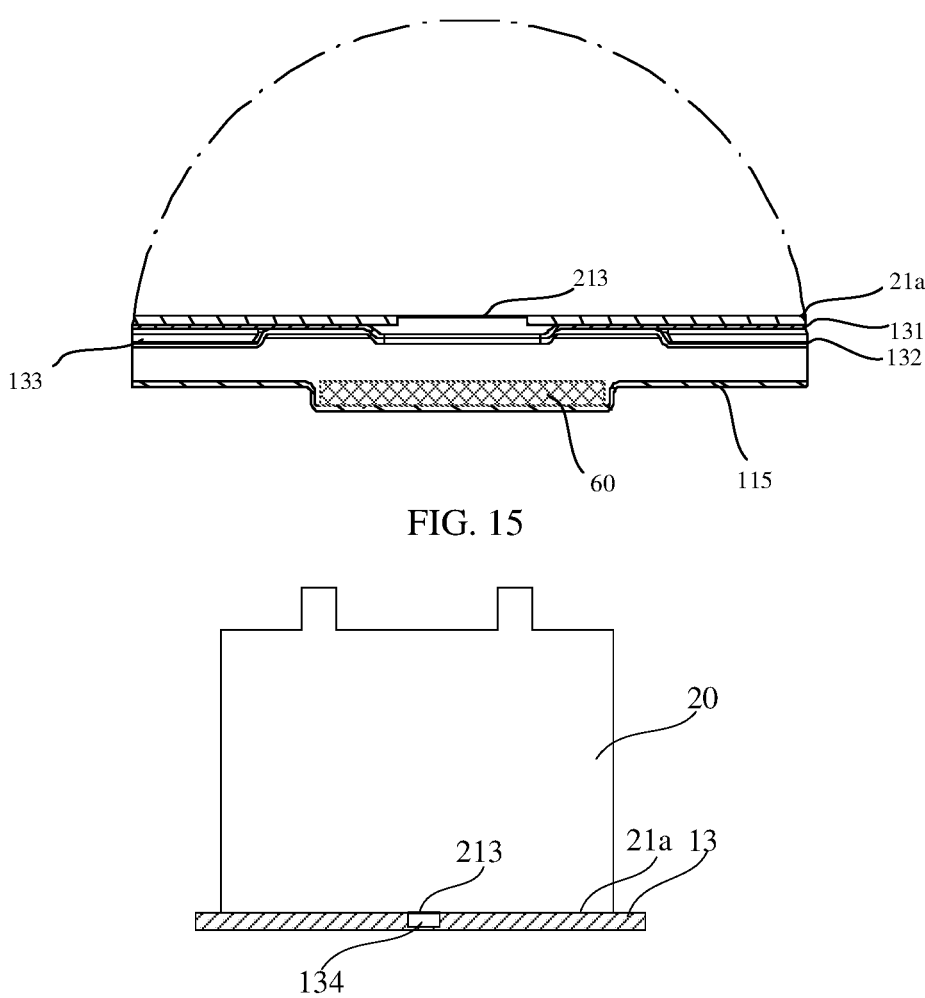

FIG. 15 shows a schematic diagram of a protective component provided with a cooling material in an embodiment of the present application. And FIG. 15 is a partial detailed view corresponding to a position E in FIG. 11*a*. As shown in FIG. 15, the cooling material 60 may be provided on the protective component 115 at a position corresponding to the pressure relief mechanism 213. In this way, the emissions discharged from the pressure relief mechanism 213 can be directly cooled by the cooling material on the protective component 115, thereby reducing the influence of high-temperature emissions on the box 11 and further reducing the influence of high-temperature emissions on the external environment of the battery 10.

Optionally, in the embodiment of the present application, a cooling material may also be arranged in the hollow beam 113*a*, and the specific arrangement is not limited in the embodiment of the present application.

It should be understood that the above only exemplarily lists several arrangements of the cooling materials, and the application does not limit the specific arrangements thereto.

Optionally, the cooling material in the embodiment of the present application may be a phase change material (Phase Change Material, PCM) coating, and the phase change material can melt when it encounters high-temperature emissions, and cool the emissions.

Optionally, in the embodiment of the present application, a high-temperature resisting material, such as mica paper, can be pasted on the bottom wall of the protective component 115 and the thermal management component 13. By pasting the high-temperature resistant material, the influence of high-temperature emissions on the surface of the exhaust path can be reduced.

Optionally, the cooling material in the embodiments of the present application may be arranged on the high-temperature resisting material, so as to reduce the temperature of the emissions while protecting the surface of the region where the emissions pass.

As an implementation manner, the thermal management component 13 in the embodiment of the present application may be configured to allow the emissions to pass through the thermal management component 13 and enter the collection chamber 13 when the pressure relief mechanism 213 is actuated.

Optionally, when the pressure relief mechanism 213 is actuated, the thermal management component 13 may be damaged. For example, the weakened zone may be provided on the thermal management component 13 and the weakened zone may be damaged, such that the emissions can pass through the thermal management component 13 and enter the collection chamber 11*b*.

It should be understood that, in addition to providing the thermal management component 13 with a structure (such as the above weakened zone) such that the thermal management component 13 can be damaged when the pressure relief mechanism 213 is actuated, the pressure relief mechanism 213 may be also provided with a damage apparatus, and the damage apparatus is configured to damage the thermal management component 13 when the pressure relief mechanism 213 is actuated, such that the fluid is discharged from the inside of the thermal management component 13. For example, the breaking apparatus may be a spike, but this is not limited by the embodiment of the present application.

Or optionally, the pressure relief mechanism 213 may be provided with a through hole corresponding to the thermal management component 13, and after the pressure relief mechanism 213 is actuated, the emissions can enter the collection chamber 11*b* through the through hole on the thermal management component 13.

The two cases of the above thermal management component 13 will be described below respectively.

In order to ensure that the pressure relief mechanism can be opened smoothly to allow the battery cells to discharge the emissions to the outside, an avoidance structure can be provided on the surface of the thermal management component 13 in the embodiment of the present application that is close to the battery cells 20, and the avoidance structure is configured to provide a space for the actuation of the pressure relief mechanism 213.

As an implementation manner, the thermal management component 13 may be attached to the plurality of battery cells 20 so that an avoidance chamber is formed between the avoidance structure and the pressure relief mechanism 213.

FIG. 16 shows a schematic diagram of an avoidance structure being an avoidance chamber in an embodiment of the present application. Specifically, the avoidance chamber 134 may be formed by the first region 131*a* of the first thermally conductive plate 131 in the embodiment of the present application being recessed toward the second thermally conductive plate 132, and the first region 131*a* is attached to the second thermally conductive plate 132, as can be seen in FIG. 7*c*. In this way, a flow channel 133 is formed around the avoidance chamber 134, and there is no flow channel in the bottom wall of the avoidance chamber 134, so as to be damaged by the emissions of the pressure relief mechanism.

Optionally, the avoidance chamber 134 includes an avoidance bottom wall and an avoidance side wall surrounding the avoidance chamber 134.

As another embodiment, the avoidance structure is a through hole penetrating the thermal management component 13, and the avoidance side wall of the avoidance structure is a hole wall of the through hole.

Figure 17:
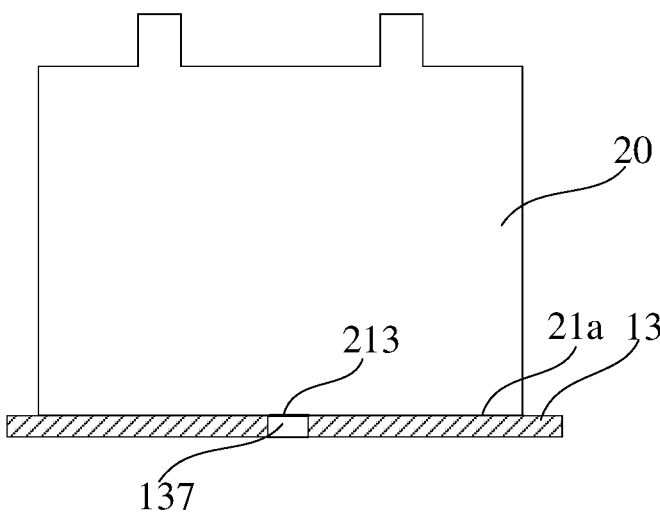
FIG. 17 is a schematic diagram of an avoidance structure being a through hole disclosed in an embodiment of the present application.

FIG. 17 shows a schematic diagram of an avoidance structure being a through hole disclosed in an embodiment of the present application. As shown in FIG. 17, the avoiding structure is the through hole 137. On the one hand, the through hole 137 may be the avoidance structure, on the other hand, the emissions of the battery cell 20 provided with the pressure relief mechanism 213 can enter the collection chamber 11*b* though the through hole 137 when the pressure relief mechanism 213 is actuated.

Optionally, the through hole 137 may be arranged opposite to the pressure relief mechanism 213.

By providing the through hole 137 corresponding to the pressure relief mechanism 213, a deformation space can be provided for the pressure relief mechanism 213, so that when the pressure relief mechanism 213 is actuated, the emissions can be discharged into the collection chamber 11*b* through the through hole 137.

As an implementation manner, the thermal management component 13 in the embodiment of the present application may be configured to be damaged when the pressure relief mechanism is actuated to allow the fluid to flow out.

Corresponding to the cases of the above avoidance chamber 134 and the through hole 137, the side wall of the avoidance chamber 134 and the side wall of the through hole 137 may be damaged. Specifically, when the pressure relief mechanism 213 is actuated, the emissions from the battery cell 20 rush into the avoidance chamber 134 or the through hole 137, Since the emissions have high pressure and high heat, the emissions further melt the hole wall of the second through hole 137 when passing through the avoidance chamber 134 or the through hole 137, so that the fluid is discharged from the interior of the thermal management component 13, thereby cooling the emissions.

The fluid is allow to be discharged from the thermal management component 13, in this way, the heat from the battery cell 20 may be absorbed and the temperature of the emissions may be reduced, and thus the risk resulting from the emissions may be reduced. In this case, the fluid enters the collection chamber 11*b* together with the emissions cooled by the fluid. Due to the cooling by the fluid, the temperature of the emissions from the battery cell 20 can be quickly reduced, and thus the risk of the emissions entering the collection chamber 11*b* is greatly reduced. The emissions do not have a great influence on other parts of the battery (such as other battery cells 20), so that the destructiveness caused by the abnormality of a single battery cell 20 can be suppressed as soon as possible, and the possibility of battery explosion can be reduced.

As an implementation manner, the battery 10 in the embodiment of the present application may include a plurality of battery cells 20, and at least one battery cell 20 of the plurality of battery cells 20 includes a pressure relief mechanism 213, the pressure relief mechanism 213 is configured to be actuated when the internal pressure or temperature of the battery cell 20 provided with the pressure relief mechanism 213 reaches a threshold value, to relieve the internal pressure; and the box 11 in the foregoing embodiments.

An embodiment of the present application further provides a power consumption device, which may include the battery 10 in each of the foregoing embodiments. Optionally, the power consumption device may be a vehicle 1, a ship or a spacecraft.

The box of a battery, the battery and the power consumption device according to the embodiments of the present application are described above, and a method and apparatus for producing a battery according to the embodiments of the present application will be described below. For the parts not described in detail, reference can be made to the foregoing embodiments.

Figure 18:
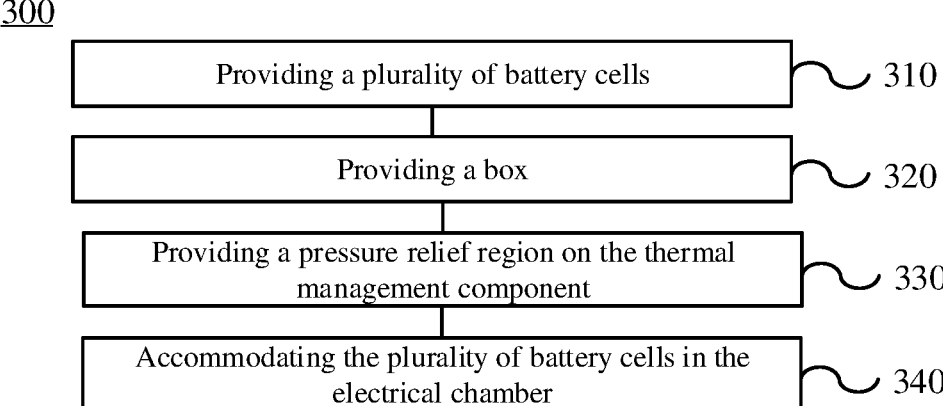
FIG. 18 is a schematic flowchart of a method for producing a battery disclosed in an embodiment of the present application.

FIG. 18 shows a schematic flowchart of a method 300 for producing a battery according to an embodiment of the present application. As shown in FIG. 18, the method 300 may include:

S310, providing a plurality of battery cells 20, and at least one battery cell 20 of the plurality of battery cells 20 includes a pressure relief mechanism 213 for being actuated when the internal pressure or temperature of the battery cell 20 provided with the pressure relief mechanism 213 reaches a threshold value, to relieve the internal pressure;

S320, providing a box 11, where the box 11 includes: an electrical chamber 11*a* configured to accommodate the plurality of battery cells 20; a thermal management component 13 configured to contain a fluid to adjust the temperature for the plurality of battery cells 20; and a collection chamber 11*b* configured to collect the emissions form the battery cell 20 provided with the pressure relief mechanism 213 when the pressure relief mechanism 213 is actuated;

S330, wherein the thermal management component 13 is configured to isolate the electrical chamber 11*a* from the collection chamber 11*b*, the pressure relief region is arranged on the thermal management component 13, and the emissions collected by the collection chamber 11*b* are discharged through the pressure relief region; and S340, the plurality of battery cells are accommodated in the electrical chamber 11*a*.

Figure 19:
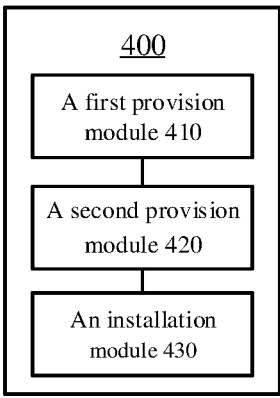
FIG. 19 is a schematic block diagram of A device for producing a battery disclosed in an embodiment of the present application.

FIG. 19 shows a schematic block diagram of an apparatus 400 for producing a battery disclosed in an embodiment of the present application. As shown in FIG. 19, the apparatus 400 for producing a battery may include: a first provision module 410, a second provision module 420 and an installation module 430.

The first provision module 410 is configured to provide a plurality of battery cells 20, and at least one battery cell 20 of the plurality of battery cells 20 includes a pressure relief mechanism 213 for being actuated when the internal pressure or temperature of the battery cell 20 provided with the pressure relief mechanism 213 reaches a threshold value, to relieve the internal pressure.

The second provision module 420 is configured to provide a box 11, where the box 11 includes: an electrical chamber 11*a* configured to accommodate the plurality of battery cells 20; a thermal management component 13 configured to accommodate a fluid to adjust the temperature of the plurality of the battery cells 20; and a collection chamber 11*b* configured to collect the emissions from the battery cell 20 provided with the pressure relief mechanism 213 when the pressure relief mechanism 213 is actuated; wherein the thermal management component 13 is configured to isolate the electrical chamber 11*a* from the collection chamber 11*b*, a pressure relief region is arranged on the thermal management component 13, and the emissions collected by the collection chamber 11*b* are discharged after passing through the pressure relief region.

The installation module 430 is configured to accommodate the plurality of battery cells 20 in the electrical chamber 11*b*.

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A box of a battery, comprising:
an electrical chamber, configured to accommodate a plurality of battery cells,
    wherein at least one battery cell of the plurality of battery cells comprises a pressure relief mechanism, and the pressure relief mechanism is configured to be actuated when an internal pressure or a temperature of the battery cell provided with the pressure relief mechanism reaches a threshold value, to relieve the internal pressure;
an isolation component; and,
a collection chamber, configured to collect emissions from the battery cell provided with the pressure relief mechanism when the pressure relief mechanism is actuated;
    wherein the isolation component is configured to isolate the electrical chamber from the collection chamber, a pressure relief region is disposed on the isolation component, and the emissions collected in the collection chamber is discharged to the outside of the collection chamber after passing through the pressure relief region;

wherein the pressure relief region is staggered with the pressure relief mechanism, and wherein the isolation component is configured to be capable of making the emissions enter the collection chamber through the isolation component when the pressure relief mechanism is actuated.

2. The box according to claim 1, wherein the pressure relief region is a pressure relief hole, and the emissions collected by the collection chamber are discharged through the pressure relief hole; or the pressure relief region is a weakened zone, and the emissions collected by the collection chamber are discharged after the weakened zone is damaged.

3. The box according to claim 1, wherein the electrical chamber comprises:

a first pressure balance mechanism, wherein the first pressure balance mechanism is configured to balance a pressure inside and outside of the box, and the emissions are discharged to the outside of the box through the first pressure balance mechanism after passing through the pressure relief region.

4. The box according to claim 3, wherein the electrical chamber comprises a first sub-chamber and a second sub-chamber, wherein the first sub-chamber is configured to accommodate the plurality of battery cells, the second sub-chamber is arranged adjacent to the first sub-chamber;

an outer wall of the second sub-chamber is provided with the first pressure balance mechanism, and the emissions collected by the collection chamber enter the second sub-chamber through the pressure relief region and are discharged to the outside of the box through the first pressure balance mechanism.

5. The box according to claim 4, wherein the pressure relief region is disposed on a region of the isolation component corresponding to the second sub-chamber.

6. The box according to claim 4, wherein a second pressure balance mechanism is provided on a wall shared by the first sub-chamber and the second sub-chamber, and the second pressure balance mechanism is configured to balance a pressure between the first sub-chamber and the second sub-chamber.

7. The box according to claim 6, wherein the second pressure balance mechanism is opened in one way, and the second pressure balance mechanism is configured to release an inner pressure to the second sub-chamber when a pressure or a temperature in the first sub-chamber reaches a certain threshold.

8. The box according to claim 7, wherein the first sub-chamber is communicated with the second sub-chamber only through the second pressure balance mechanism.

9. The box according to claim 4, wherein a third pressure balance mechanism is provided on other walls of the first sub-chamber except a wall of the first sub-chamber shared by the first sub-chamber and the second sub-chamber, and the third pressure balance mechanism is configured to release the inner pressure to the outside of the box when the pressure or temperature in the first sub-chamber reaches a certain threshold.

10. The box according to claim 4, wherein the electrical chamber is provided with a hollow beam, a first wall of the second sub-chamber is formed with at least a portion of the hollow beam, a fourth pressure balance mechanism is disposed on the first wall, the emissions collected by the collection chamber enter the hollow beam through the pressure relief region, and then enter the second sub-chamber through the fourth pressure balance mechanism, and is discharged to the outside of the box through the first pressure balance mechanism.

11. The box according to claim 1, wherein the electrical chamber is provided with a hollow beam, and the hollow beam is configured to be connected to an outer wall of the electrical chamber, a fifth pressure balance mechanism is disposed on the outer wall of the electrical chamber, the emissions collected by the collection chamber enter the hollow beam through the pressure relief region, and is discharged to the outside of the box through the fifth pressure balance mechanism.

12. The box according to claim 10, wherein the pressure relief region is disposed on a region of the isolation component corresponding to the hollow beam.

13. The box according to claim 10, wherein a cooling material is provided in the hollow beam; and/or wherein a cooling material is provided on a surface of the isolation component away from the battery cell.

14. The box according to claim 1, wherein the box further comprises:

a protective component, wherein the protective component is located on one side of the isolation component away from the battery cell, the collection chamber is formed with the protective component and the isolation component, and a cooling material is provided on the protective component.

15. The box according to claim 14, wherein the protective component and the isolation component are sealed and connected; and/or wherein the cooling material provided on the protective component is disposed in a region of the protective component corresponding to the pressure relief mechanism.

16. The box according to claim 1, wherein the isolation component comprises:

a first thermally conductive plate, wherein the first thermally conductive plate is attached to the plurality of battery cells;

a second thermally conductive plate, wherein the second thermally conductive plate is arranged on one side of the first thermally conductive plate away from the battery cell; and a flow channel, wherein the flow channel is formed between the first thermally conductive plate and the second thermally conductive plate to allow the fluid to flow therein.

17. A battery, comprising:

a plurality of battery cells, wherein at least one battery cell of the plurality of battery cells comprises a pressure relief mechanism, and the pressure relief mechanism is configured to be actuated when internal pressure or a temperature of the battery cell provided with the pressure relief mechanism reaches a threshold value, to relieve the internal pressure; and a box of the battery, wherein the box comprising:

an electrical chamber, configured to accommodate a plurality of battery cells, wherein at least one battery cell of the plurality of battery cells comprises a pressure relief mechanism, and the pressure relief mechanism is configured to be actuated when an internal pressure or a temperature of the battery cell provided with the pressure relief mechanism reaches a threshold value, to relieve the internal pressure;

an isolation component; and, a collection chamber, configured to collect emissions from the battery cell provided with the pressure relief mechanism when the pressure relief mechanism is actuated;

wherein the isolation component is configured to isolate the electrical chamber from the collection chamber, a pressure relief region is disposed on the isolation component, and the emissions collected in the collection chamber is discharged to the outside of the collection chamber after passing through the pressure relief region;

wherein the pressure relief region is staggered with the pressure relief mechanism, and wherein the isolation component is configured to be capable of making the emissions enter the collection chamber through the isolation component when the pressure relief mechanism is actuated.

18. A power consumption device, comprising the battery according to claim 17.

\* \* \* \* \*